US012218941B2

(12) United States Patent
Pringle

(10) Patent No.: US 12,218,941 B2
(45) Date of Patent: *Feb. 4, 2025

(54) AI-DRIVEN INTEGRATION PLATFORM AND USER-ADAPTIVE INTERFACE FOR BUSINESS RELATIONSHIP ORCHESTRATION

(71) Applicant: Citizens Financial Group, Inc., Providence, RI (US)

(72) Inventor: Ross Pringle, Barrington, RI (US)

(73) Assignee: Citizens Financial Group, Inc., Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/408,878

(22) Filed: Jan. 10, 2024

(65) Prior Publication Data

US 2024/0214381 A1    Jun. 27, 2024

Related U.S. Application Data

(63) Continuation of application No. 18/353,557, filed on Jul. 17, 2023, now Pat. No. 11,909,737.

(60) Provisional application No. 63/390,748, filed on Jul. 20, 2022.

(51) Int. Cl.
*H04L 9/40*    (2022.01)
*G06N 5/02*    (2023.01)

(52) U.S. Cl.
CPC .............. *H04L 63/10* (2013.01); *G06N 5/02* (2013.01); *H04L 63/0815* (2013.01)

(58) Field of Classification Search
CPC ........ H04L 63/10; H04L 63/0815; G06N 5/02
See application file for complete search history.

(56) References Cited

U.S. PATENT DOCUMENTS

| | | | |
|---|---|---|---|
| 10,346,900 B1 * | 7/2019 | Wilson | G06F 8/38 |
| 10,346,900 B1 | 7/2019 | Wilson et al. | |
| 10,354,325 B1 * | 7/2019 | Skala | G06Q 20/065 |
| 10,599,699 B1 * | 3/2020 | Bartolome | G06F 16/35 |
| 10,614,345 B1 * | 4/2020 | Tecuci | G06N 3/08 |
| 10,891,156 B1 * | 1/2021 | Zhao | G06F 9/4881 |
| 11,029,819 B2 * | 6/2021 | Gerges | G06F 40/258 |
| 11,108,828 B1 * | 8/2021 | Curtis | H04L 63/20 |
| 11,294,784 B1 * | 4/2022 | Bergman | G06N 20/00 |
| 11,635,883 B2 * | 4/2023 | Farrell | G06F 16/22 |
| | | | 715/783 |
| 2007/0016016 A1 * | 1/2007 | Haras | A61B 6/507 |
| | | | 600/407 |

(Continued)

*Primary Examiner* — Jason Chiang
(74) *Attorney, Agent, or Firm* — Ice Miller LLP

(57) ABSTRACT

A system, method and tangible non-transitory storage medium are disclosed. The system includes an integration platform configured to generate in interactive graphical user interface (GUI) that simultaneously displays and provides access to a combination of services, internal resources and external resources. Responsive to receiving input from a user device, the interactive GUI provide access to one or more selected services, internal resources and/or external resources. The integration platform may also monitor and capture interaction data associated with activity between the user device and the integration platform, execute machine learning model(s) to predict user-specific interaction tendencies, and revise one or more aspects of interactive GUI based on the predicted user-specific interaction tendencies.

23 Claims, 8 Drawing Sheets

(56) References Cited

U.S. PATENT DOCUMENTS

| | | | |
|---|---|---|---|
| 2011/0185288 A1* | 7/2011 | Gupta | H04L 65/401 715/752 |
| 2014/0098949 A1* | 4/2014 | Williams | H04M 3/5191 379/265.09 |
| 2016/0366246 A1* | 12/2016 | Battle | G06F 9/5055 |
| 2018/0268467 A1* | 9/2018 | Labarre | G06F 16/9027 |
| 2019/0114151 A1* | 4/2019 | Jacobs | G06F 21/6245 |
| 2020/0007531 A1* | 1/2020 | Koottayi | H04L 67/146 |
| 2020/0042920 A1* | 2/2020 | Moorthy | G06N 20/00 |
| 2020/0125586 A1* | 4/2020 | Rezaeian | G06F 3/048 |
| 2020/0234157 A1* | 7/2020 | Kagawa | G06F 16/908 |
| 2021/0081819 A1* | 3/2021 | Polleri | G06N 5/022 |
| 2021/0174230 A1* | 6/2021 | Liu | G06Q 30/0631 |
| 2021/0224306 A1* | 7/2021 | Choudhary | G06Q 30/0281 |
| 2021/0271530 A1* | 9/2021 | Carteri | G06F 9/541 |
| 2021/0303317 A1* | 9/2021 | Sanghvi | G06F 16/9035 |
| 2021/0304057 A1* | 9/2021 | Kundu | G06N 5/02 |
| 2021/0334730 A1* | 10/2021 | Todd | H04L 67/535 |
| 2022/0020085 A1* | 1/2022 | Degrazia | G06F 16/9535 |
| 2022/0308895 A1* | 9/2022 | Ben-Elazar | G06N 3/045 |
| 2022/0366459 A1* | 11/2022 | Vieyra | H04L 65/4038 |
| 2022/0374273 A1* | 11/2022 | Eldar | G06F 16/2465 |
| 2022/0413814 A1* | 12/2022 | Mukherjee | G06F 8/34 |
| 2023/0050034 A1* | 2/2023 | Ben-Elazar | G06Q 50/205 |
| 2023/0064655 A1* | 3/2023 | Selinger | G06Q 30/0241 |
| 2023/0099627 A1* | 3/2023 | Duckworth | G06Q 40/03 706/12 |
| 2023/0154113 A1* | 5/2023 | Pratt | G06Q 30/016 345/473 |
| 2023/0245651 A1* | 8/2023 | Wang | G06N 5/022 704/275 |
| 2023/0252060 A1* | 8/2023 | Najumudeen | G06N 3/02 707/728 |
| 2023/0297831 A1* | 9/2023 | Saadi | G06N 3/08 706/25 |

\* cited by examiner

FIG. 7

AI-DRIVEN INTEGRATION PLATFORM AND USER-ADAPTIVE INTERFACE FOR BUSINESS RELATIONSHIP ORCHESTRATION

CROSS-REFERENCE TO RELATED APPLICATION

This application is a continuation of U.S. patent application Ser. No. 18/353,557, filed Jul. 17, 2023, which claims the benefit of priority under 35 U.S.C. § 119(e) to U.S. Patent Application No. 63/390,748, filed Jul. 20, 2022, each of which is incorporated herein by reference in their respective entirety.

TECHNICAL FIELD

The present disclosure generally relates to electronic system integration, and more particularly, to an electronic platform that integrates multiple independent electronic systems, data, and information sources and provides access to the same via a unique, adaptive and intuitive interactive graphic user interface.

BACKGROUND

There currently does not exist a system, apparatus or computer program product that is able to integrate and/or leverage multiple independent systems, computer software programs, data sources and/or resources, intelligently model data and information obtained therefrom, intelligently provide user-personalized experiences and access thereto via a single interface, and orchestrate complex business-to-business relationships. This is due, in part, because existing systems and technology in the art are deficient on many levels. Such deficiencies include (without limitation): an inability to access and procure data from disparate data sources and repositories in a system-resource efficient manner; an inability to capture and model all types of user interaction data to intelligently predict and efficiently obtain user-specific data and information; limitations of existing artificial intelligence (AI) based interfaces to process and/or respond to complex user inquiries and demands (e.g., limitations of existing recommendation engines and chat bots); an inability to recognize user tendencies; an inability to provide simultaneous and integrated access to multiple, independent applications, services and/or resources (e.g., accessing and utilizing a data source from within an unrelated, independent software application); security deficiencies relating to document sharing; an inability to provide access to independent systems without multiple instances of user authentication/authorization; a lack of connectivity and integration for executing multi-party communications and/or multi-system interactions and/or transactions; an inability of system and/or interactive graphic user interfaces to automatically evolve in accordance with shifts in user preferences and/or tendencies; and others.

As a result of the foregoing (and other) deficiencies, existing systems in this art operate inefficiently, experience extensive latency, and/or operate using incomplete, inaccurate and/or outdated data and information. In addition, existing systems are incapable of providing user-personalized experiences and system interactions. Accordingly, there is a need for a new type of system, method and computer program product that addresses the foregoing and other deficiencies in the art.

SUMMARY

A system according to the present disclosure may include an integration platform. The integration platform may include one or more servers, one or more processors, and a memory storing computer-readable instructions that, when executed by the one or more processors, cause the integration platform to perform operations. The operations may include generating in interactive graphical user interface (GUI) that simultaneously displays one or more regions, each of which may be associated with a combination of one or more services of the integration platform, one or more internal resources of the integration platform, and one or more external resources from among one or more third-party computing systems. The operations may further include receiving, over a communications network, input from a user device via the interactive GUI. The input may comprise a selection of at least one among the one or more services, the one or more internal resources and the one or more external resources. Responsive to receiving the input, the operations may include providing access, to the user device via the interactive GUI, to at least one among the one or more services, the one or more internal resources and the one or more external resources associated with the selection. Further, the operations may include monitoring and capturing interaction data associated with activity between the user device and the integration platform, and executing one or more machine learning models, based on the interaction data, to predict user-specific interaction tendencies. The operations may also include revising one or more aspects of interactive GUI based on the predicted user-specific interaction tendencies.

A method according to the present disclosure may be executed, at least in part, by an integration platform. The integration platform may include one or more servers, one or more processors, and a memory storing computer-readable instructions that, when executed by the one or more processors, cause the integration platform to perform operations according to the method. The method may include generating in interactive graphical user interface (GUI) that simultaneously displays one or more regions, each of which may be associated with a combination of one or more services of the integration platform, one or more internal resources of the integration platform, and one or more external resources from among one or more third-party computing systems. The method may further include receiving, over a communications network, input from a user device via the interactive GUI. The input may comprise a selection of at least one among the one or more services, the one or more internal resources and the one or more external resources. Responsive to receiving the input, the method may include providing access, to the user device via the interactive GUI, to at least one among the one or more services, the one or more internal resources and the one or more external resources associated with the selection. Further, the method may include monitoring and capturing interaction data associated with activity between the user device and the integration platform, and executing one or more machine learning models, based on the interaction data, to predict user-specific interaction tendencies. The method may also include revising one or more aspects of interactive GUI based on the predicted user-specific interaction tendencies.

A tangible non-transitory storage medium according to the present disclosure is disclosed herein. The tangible non-transitory storage medium includes one or more sequences of computer-readable instructions that, when executed by one or more processors, cause a computer device or system to perform operations. The operations may include generating in interactive graphical user interface (GUI) that simultaneously displays one or more regions, each of which may be associated with a combination of one or more services of the integration platform, one or more internal resources of the integration platform, and one or more external resources from among one or more third-party computing systems. The operations may further include receiving, over a communications network, input from a user device via the interactive GUI. The input may comprise a selection of at least one among the one or more services, the one or more internal resources and the one or more external resources. Responsive to receiving the input, the operations may include providing access, to the user device via the interactive GUI, to at least one among the one or more services, the one or more internal resources and the one or more external resources associated with the selection. Further, the operations may include monitoring and capturing interaction data associated with activity between the user device and the integration platform, and executing one or more machine learning models, based on the interaction data, to predict user-specific interaction tendencies. The operations may also include revising one or more aspects of interactive GUI based on the predicted user-specific interaction tendencies.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

FIG. 7 illustrates an exemplary embodiment of an interactive GUI according to the present disclosure.

To facilitate understanding, identical reference numerals may have been used, where possible, to designate identical elements that are common to the figures. It is contemplated that elements disclosed in one embodiment may be beneficially utilized on other embodiments without specific recitation.

DETAILED DESCRIPTION

Figure 1:
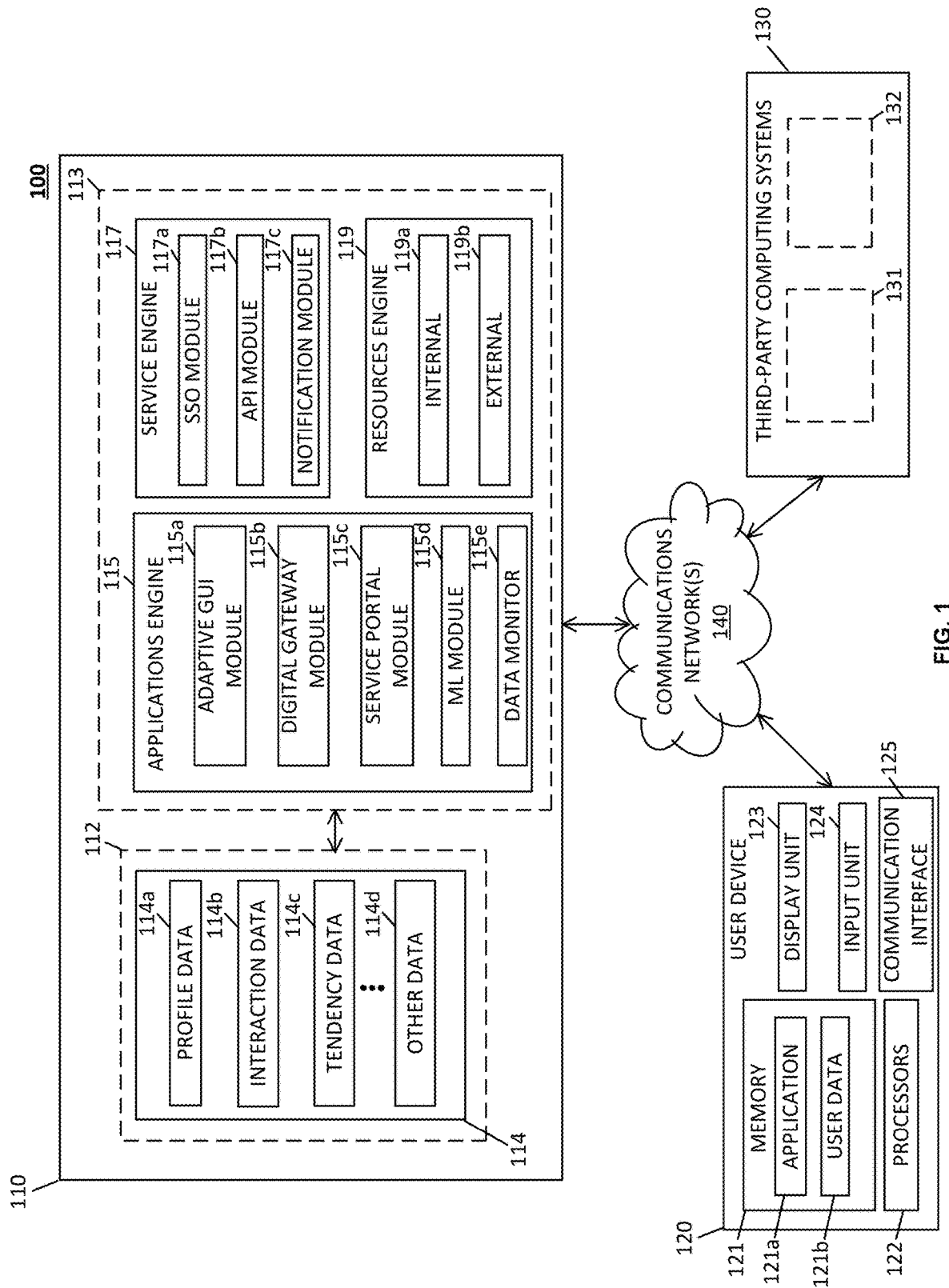
FIG. 1 illustrates a diagram of an exemplary system according to the present disclosure.

The present disclosure relates to systems, methods and computer program products (e.g., tangible non-transitory storage medium) for integrating multiple, independent systems, computer software programs and/or digital service offerings, and for generating an intuitive interactive graphic user interface (GUI) that intelligently provides access to the same from one single source. In some aspects, the availability, accessibility, arrangement, and/or integration of systems, programs and/or services may themselves be customized according to each user's tendencies (e.g., via user preferences and machine learning modeling), so as to provide each user with a unique and customized experience. As each user's tendencies, interactions, and/or requirements evolve over time, aspects of the present disclosure will similarly evolve, so as to continually provide each user with a customized, up-to-date interaction and a personalized relationship experience.

Existing systems and technology in the art are deficient on many levels. Such deficiencies include (among other): an inability to access and procure data from disparate data sources and repositories in a system-resource efficient manner; an inability to capture and model all types of user interaction data to intelligently predict and efficiently obtain user-specific data and information; limitations of existing artificial intelligence (AI) based interfaces to process and/or respond to complex user inquiries and demands (e.g., limitations of existing recommendation engines and chat bots); an inability to recognize user tendencies; an inability to provide simultaneous and integrated access to multiple, independent applications, services and/or resources (e.g., accessing and utilizing a data source from within an unrelated, independent software application); security deficiencies relating to document sharing; an inability to provide access to independent systems without multiple instances of user authentication/authorization; a lack of connectivity and integration for executing multi-party communications and/or multi-system interactions and/or transactions; an inability of system and/or interactive GUI's to automatically evolve in accordance with shifts in user tendencies; and others.

In addition, industry-specific systems tend to focus solely on the type of services and products that pertain to that industry. For example, in a digital banking industry, existing systems may be limited to providing transactional capabilities and functions that directly relate thereto. However, such systems fail to provide what may be perceived to be unrelated product, information, service or customer support offerings, but nonetheless complement and/or enhance a business relationship, and the user's interaction with the system.

From a user's perspective, such deficiencies result in delayed and/or inaccurate responses to electronic inquiries (e.g., via phone calls, email or traditional chat bot), limited or inaccurate information or data retrieval, a need to continually access multiple systems, platforms and/or services, inability to connect to account, system, and/or service assistance and/or technology (e.g., actual and/or digital service representatives) in a timely manner, leakage of sensitive data, inefficiencies of multiple log-ins, a need to connect with human representatives even for basic inquiries, inability to securely and efficiently consummate multi-party/multi-system interactions (e.g., communications, transactions, customer service, etc.), and others.

Having recognized the foregoing (and other) deficiencies, the present disclosure provides a new type of integration and interaction platform (also referred to as the "integration platform") with a new intuitive and adaptive interactive GUI that represents a significant technological advancement over any system in existence. As will be discussed herein, features of this new integration platform and GUI may include (without limit) functions for dynamically connecting and enabling real-time interaction and updates amongst multiple internal and external users (e.g., customer representatives, external support representatives, accountants and attorneys, internal deal and servicing team members, etc.) on a single interactive interface, one-click access to an advanced type of AI-driven chat-bot, intelligent access to an enhanced knowledge/intelligence hub that itself continually learns and updates its information and intelligence, integrated with secure real-time and persistent multi-party communications, multi-party appointment scheduling, delivery of real time notifications and alerts (e.g., transaction approvals and status, etc.), generation and delivery of personalized offers and proposals, embedded commercial document exchange and e-signature capabilities, 1:1 and multi-party digital video chat, embedded voice of customer research functions, case creation (e.g., generating servicing requests), real time delivery of user specific advisory content, and others.

Other benefits and improvements provided by the present disclosure include (without limitation) providing anytime digital access (i.e., 24 hrs/day, 365 days/yr.) to product and/or service offerings that conventionally were only available during certain portions of each business day (e.g., 9 AM-5 PM). The present disclosure also integrates human and digital servicing, offering an active directory of human advisors and an AI-based rules engine to enable a combination of human/machine based secure messaging, multi-party communications, scheduling, data access, etc. In this manner, the present disclosure provides users with highly secure, assured and reliable channels of information, services, digital communication, etc.

In addition, the present disclosure describes new technology that replaces traditional analog communication channels (e.g., phone, mail) with asynchronous and/or real-time communications capabilities (digital, videoconference, multi-party chat, etc.) and intelligent routing of communications to dedicated client relationship representatives (e.g., account/relationship manager, dedicated servicers, etc.) and/or to an automated AI-based interface (e.g., the one-click advanced 'chat-bot' mentioned above) that processes user input to predict and/or suggest responses to the user. The combination of human, automation (e.g., AI based bot), and intelligent self-service capabilities will enable users to access and retrieve data and information faster and more efficiently, and in some cases (e.g., direct to device notifications), without having to log into their corporate network. Further still, aspects of the present disclosure relate to capturing, processing and modeling much more user interaction data than any other system in the art. This user interaction data is continually captured and combined into a comprehensive data repository, which in turn may be accessed by rules and modeling engines to continually develop and update advanced predictive analytics. As noted above, the advanced predictive analytics may be used to anticipate and prescribe user interaction requirements, and to customize each user's interaction experience accordingly.

As will be discussed herein, the intuitive and user-adaptive interactive GUI of the present disclosure (also referred to as a "intelligent interactive GUI" or simply "interactive GUI") provides a new way of interacting between users (e.g., consumers and/or product/service representatives) in relationship-based business-to-business and commercial environments. At its core, the interactive GUI provides access to a secure, persistent multi-party multi-channel integration platform for communications between customer relationship systems, product/service systems, corporate entity systems, and their clients (end users), that integrates new and intelligent self-service functionality, document sharing, electronic transaction services, automated advice and status/notifications, single and multi-party communications, real time research and feedback capabilities, data storage and retrieval, intuitive search functions, and other online products and services, all through one innovative integration platform.

In some embodiments, certain independent third party systems, products and/or services may automatically be aligned and presented for collective or simultaneous access by a user via the interactive GUI, for example, based on that user's tendencies to utilize such systems, products and/or services together. In some embodiments, the user's tendencies may include language tendencies (e.g., terminology, phrases, format, dialect, etc.) that inform, via machine learning modeling, how to interpret user queries, input and other interactions. This may be accomplished, for example, by modeling the user's current and/or historical interactions (and/or the interactions of other users having similar user profile characteristics) to develop advanced analytics, using the advanced analytics to predict and/or suggest the user's current and/or future interactions, and then generating or revising the interactive GUI (and other services and resources) in accordance with the predicted and/or suggested user interactions. This type of intelligent integration not only improves the user's experience (e.g., by customizing interactions according to each user's tendencies), but it also improves the interactive GUI (e.g., by arranging icons and functionality that are used together close to each other and/or those used most frequently in a prominent position) and the overall integrated system itself. Indeed, by intelligently predicting user interactions and automatically creating anticipatory links and/or connections on behalf of each user (e.g., including log-in and/or before a user even logs-in to and/or connects to the systems described herein), system speed and efficiencies are measurably improved. For example, by creating and/or initiating anticipatory links and connections (e.g., function calls) based on the predicted user behavior (e.g., aspects and functions likely to be utilized by the user), the system avoids having to maintain active links and connections (i.e., relating to those functions and operations that are deemed unlikely or rarely utilized), which preserves system resources. Further, understanding and predicting user behavior enables the system to provide real-time or near real-time access to those functions and operations deemed likely to be accessed and utilized by the user.

Turning now to FIG. 1, a diagram of an exemplary system 100 according to the present disclosure is shown. The exemplary system 100 includes, among other things, an integration platform 110, one or more user devices 120, and one or more third-party computing systems 130. Each of the integration platform 110, the one or more user devices 120 and the one or more third-party computing systems 130 may be operatively connected to, and interconnected across, one or more communications networks 140. Examples of communications networks 140 may include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet, Bluetooth™, low-energy Bluetooth™ (BLE), ZigBee™, ambient backscatter communication (ABC) protocols, and so on. In some embodiments, communications between or amongst the integration platform 110, the one or more user devices 120 and/or the one or more third-party computing systems 130 may be encrypted and/or secured by establishing and maintaining one or more secure channels of communication across communications network(s) 140, such as, but not limited to, a transport layer security (TLS) channel, a secure socket layer (SSL) channel, or any other suitable secure communication channel.

The integration platform 110, may include one or more servers and one or more tangible, non-transitory memory devices storing executable code, software modules, applications, engines, routines, algorithms, etc. Each of the one or more servers may include one or more processors, which may be configured to execute portions of the stored code, software modules, applications, engines, routines, etc. to perform operations consistent with those described herein.

The executable code, software modules, applications, engines, routines, algorithms, etc. described herein may comprise collections of code or computer-readable instructions stored on a media (e.g., memory of the integration platform 110) that represent a series of machine instructions (e.g., program code) that implements one or more steps, features and/or operations. Such machine instructions may be the actual computer code that the processor(s) (not shown) of the integration platform 110 interpret to implement the instructions or, alternatively, may be a higher level of coding of the instructions that is interpreted to obtain the actual computer code. The software modules, engines, routines, algorithms, etc. may also include one or more hardware components. One or more aspects of an example module, engine, routine, algorithm, etc. may be performed by the hardware components (e.g., circuitry) itself, rather as a result of the instructions.

Although the integration platform 110 of FIG. 1 is shown as comprising a discrete computing system, it should be understood that integration platform 110 may correspond to a distributed computing system having multiple computing components distributed across one or more computing networks, such as communications networks 140 of FIG. 1, and/or those established and maintained by one or more cloud-based providers. Further, integration platform 110 may include one or more communications interfaces, such as one or more wireless transceivers, coupled to the one or more processors for accommodating wired or wireless internet communication across the one or more communications networks 140 with other computing systems and devices (e.g., user device(s) 120, third-party computing system(s) 130, etc.) operating within a computing environment.

As described herein, integration platform 110 may be configured to perform any of the exemplary functions and/or processes described herein to, among other things, host, store, maintain and operate application engines and/or application modules for enabling remote and dynamic collaboration and communications (e.g., via video, voice, etc.) of multiple users that are remote from each other on a single, adaptive and interactive graphic user interface (GUI), as well as providing one-click access to an advanced type of artificial-intelligence (AI) driven chat-bot, intelligent and predictive access to an enhanced knowledge/intelligence hub that itself continually learns and updates its information and intelligence, access to any number of independent internal and/or external resources and services, delivery of real time notifications and alerts (e.g., transaction approvals and status, etc.), embedded commercial document exchange and e-signature functions, embedded voice of customer research functions, case creation (e.g., generating servicing requests), real time delivery of user specific advisory content, and others. In this regard, the integration platform 110 may generate and make available the adaptive and interactive GUI described herein, which is capable of receiving input in real-time, and simultaneously from multiple users and sources, as well as intelligently presenting features and functions of the integration platform 110 to each user in a user-specific manner.

Additionally, the integration platform 110 may be configured to receive, generate and/or compile information or data associated with one or more users. Examples of such data and information may include, for example, profile data 114a, interaction data 114b, tendency data 114c, and any other type of data 114n generated or captured by the integration platform 110, the user device(s) 120, the third-party computing system(s) 130 or any other source (collectively, "user data"). Profile data 114a may include (without limit), a user's name, social security number, mailing address(es), email address(es), biometric data, account information, security information or credentials (e.g., pin number, log-in credentials, etc.), user preferences (e.g., as to interface layout, output, products, services, function configurations, etc.), credit scores, transaction history, criminal records, background information, phone number(s), demographic information, financial information, work information, authentication data/documents (e.g., a driver's license, an identification card, biometric scan, etc.), corporate identifiers, etc.

Interaction data 114b may include data and information pertaining to users' interactions with the integration platform 110, with the user device(s) 120 and/or with the third-party computing system(s) 130. Examples of interaction data 114b may include, without limit, inputs, requests, selections, queries, length of interactions, types of features and functions initiated, reactions (e.g., responsive inputs) to integration platform 110 output, geo-location of device(s) used to access the integration platform 110, type of data downloaded and/or uploaded, etc. Interaction data 114b may be tracked in real-time as users (via user device(s) 120) are interacting with the integration platform 110, and it may include historical interaction data (e.g., captured during prior interaction sessions with any of the integration platform 110, user device(s) 120 and/or third-party computing system(s) 130).

Tendency data 114c may include data indicative of a particular user's tendencies, which may include data indicative of the user's inclination to provide certain types of inputs, make certain types of requests, initiate certain types of features and functions, and so on. Tendency data 114c may also include predictive and/or suggested interactions, as determined by the integration platform 110. As will be discussed further below, users' tendency data may be determined by modeling (e.g., via one or more machine learning models) profile 114a, interaction data 114b and other user-related data of a particular user and/or of a plurality of users sharing similar profile characteristics, alone or in combination, with other types of data 114n.

In order to store, maintain and access data and information, the integration platform 110 may include, within the one or more tangible, non-transitory memory devices, a data repository 112 that includes one or more databases 114. The one or more databases 114 may be configured to store, maintain and provide access to the user data (e.g., profile data 114a, interaction data 114b, tendency data 114c, etc.), as well as other types of data and information 114n that may be generated and/or captured by the integration platform 110, the user device(s) 120, and/or the third-party computing system(s) 130.

The integration platform 110 may also include, within the one or more tangible, non-transitory memory devices, an applications repository 113 that facilitates the performance of any of the exemplary processes and functions described herein. As illustrated in FIG. 1, applications repository 113 may include, among others, an applications engine 115, a services engine 117, and a resources engine 119, each of which comprises computer-readable instructions that, when executed by one or more processors, enables each to generate, launch, execute and/or provide access to its respective applications, engines, modules, components, functions and/or operations. The applications engine 115 may itself comprise one or more applications, modules, engines, etc., including an adaptive GUI module 115a, a digital gateway module 115b, a service portal module 115c and a machine learning (ML) module 115d. The applications engine 115 may further include one or more software applications (not shown) that may be accessed to provide users with certain features and functions (discussed further below).

The adaptive GUI module 115a may be configured to generate and dynamically update a user-adaptive interactive GUI that may be rendered on the one or more user devices 120. As discussed further below, the user-adaptive interactive GUI provides an interactive and adaptive single point of access to all services, functions, resources, applications, data, etc. provided directly or indirectly by the integration platform 110.

The digital gateway module 115b may be configured to generate one or more digital gateways through which the user devices 120 (via the user-adaptive interactive GUI) may access deployments and/or instances of one or more of the services, internal resources and/or external resources of the integration platform 110.

The service portal module 115c may be configured to generate one or more service portals through which the user devices 120 (via the user-adaptive interactive GUI) may access deployments and/or instances of one or more of the services, internal resources and/or external resources of the integration platform 110.

The machine learning (ML) module 115d may be configured to execute one or more machine learning models, based on current and/or historic user data (e.g., relating to one or more users having similar profile characteristics), to develop advanced behavior/tendency analytics, predict and suggest current and/or future users' interactions based on the analytics, and generate and/or revise user-specific interactions with the integration platform 110. This includes, for example, generating and revising user-specific user-adaptive interactive GUIs to reflect of each user's tendencies, and creating anticipatory links and/or connections to services, functions, applications, resources, etc. on behalf of each user.

The data monitor 115e may be configured to monitor the usage and interactions between users of the one or more user devices 120 and the integration platform 110, and capture profile data 114a and interaction data 114b associated therewith. In some examples, the data monitor 115e may be configured to perform monitoring and data capture functions continually and in real-time, as users of the one or more user devices 120 are interacting with the integration platform 110, and/or periodically, at predetermined times or intervals or in connection with predetermined types of interactions. The data monitor 115e may also be configured to capture historical profile data 114a (e.g., from the one or more user devices 120 and/or third-party computing systems 130) and/or historic interaction data 114b (e.g., captured during prior interaction sessions with any of the integration platform 110, other user device(s) 120 and/or third-party computing system(s) 130). In some embodiments, the data monitor 115e may also be configured to access and/or provide aspects of the profile data 114a and the interaction data 114b (both current and historic) to other components of the integration platform 110, in real-time and/or as needed (e.g., to the adaptive GUI module 115a, the ML module 115d, the SSO module 117a, etc.).

Turning now to the services engine 117, this engine 117 may comprise (among others) a single sign-on (SSO) engine 117a, an application program interface (API) engine 117b and a notification engine 117c. The SSO engine 113a may be configured to perform authentication services and functions in connection with granting access to the integration platform 110, as well as to services, resources and functions provided by and/or accessed through the integration platform 110.

The API module 117b may be configured generate any number of application program interfaces (APIs) to enable communications between applications (e.g., software programs, modules, engines), services, resources, etc., including those within the integrated platform 110 and those from external sources (e.g., user devices 120, third-party computing systems 130, etc.). In some embodiments, the API module 117b may be configured to refresh one or more request/response and/or event-driven APIs in real-time or near real-time, so as to provide seamless access to any of the applications, services and/or resources described herein.

The notification module 117c may be configured to generate and transmit automated notifications, alerts, messages, etc., in real-time or near real-time, to any of the one or more user devices 120 (e.g., within the user-adaptive interactive GUI) and the third-party computing systems 130.

The resources engine 119 may include an internal resources module 119a and an external resources module 119b. The internal resources module 119a may be configured to generate, maintain and/or provide access to one or more internal resources. For purposes of this disclosure, internal resources may comprise any physical or virtual components within the integration platform 110. Internal server components and connected devices, as well as virtual components such as files, network connections, memory, etc., may also be referred to as internal resources. By way of (non-limiting) examples, internal resources may include databases (e.g., data lakes, directories, customized/personalized dashboards and reporting, etc.) and connections (e.g., network connections) that facilitate access to external resources and/or that may provide information and/or services directly to user devices 120 (e.g., content from an external system, for example, Customer Relationship Management (CRM) systems, Content Management Systems (CMS), large and small language models (LLM/SLMs), communication channel services, research and feedback collection services, etc.).

The external resources module 119b may be configured to generate, maintain and/or provide access to one or more external resources though direct integrations or real-time or near real time API connectivity. For purposes of this disclosure, external resources may include any combination of product, data and/or service offerings provided by one or more independent systems or networks (e.g., third-party computing systems 130). External resources may include cloud-based services, as well as other types of services. Examples of external resources may include, without limit, communication services (e.g., video chat, 1-on-1 and multi-party secure chat, text messenger, telephony, group conferencing, etc.), scheduling services (e.g., for group meetings), document services (e.g., e-signature services, document generation and transmission, personalized document creation/editing, document sharing, etc.), knowledge-based services (e.g., search engine, video libraries, AI/ML modeling services, etc.), chat-bot services, curated business corpus knowledge libraries with associated large language models, and others.

In some embodiments, the external resources module 119b may be configured to deliver external resources directly to the user-adaptive interactive GUI, to be accessed directly by the users (e.g., via user devices 120). In other embodiments, the internal resources module 119a may facilitate indirect access to the external resources. In other words, the internal resources module 119a may cause one or more internal resources to access one or more external resources, and in turn, deliver the one or more external resources to the user-adaptive interactive GUI for access by the users. User entitlements, permissioning and security configuration of underlying internal and external systems may dictate access to the internal and external resources that are orchestrated by the user-adaptive interactive GUI.

As indicated above, access to a combination of internal and external resources may be facilitated by the one or more digital gateways and/or service portals generated by the digital gateway module 115b and the service portal module 115c, respectively. In some embodiments, the one or more user devices 120 may directly access internal and/or external resources via a dedicated access means (e.g., smartphone, e-mail, dedicated web-application, etc.) using a single log-in procedure facilitated by the SSO engine 117a.

The one or more user devices 120 of the exemplary system 100 may each comprise one or more tangible, non-transitory memory 121 that stores software instructions 121a and/or data 121b, and one or more processors 122 configured to execute the software instructions 121a. The one or more tangible, non-transitory memory 121 may, in some examples, store application programs, application engines or modules, and other elements of code (collectively, 121a) executable by the one or more processors 122. As illustrated in FIG. 1, the one or more user devices 120 may store within the one or more tangible, non-transitory memory 121, an executable application 121a, which may be provisioned to any of the one or more user devices 120. The executable application 121a may, when executed, provide the one or more user devices 120 with access one or more applications, services and/or resources of the integration platform 110, including the user-adaptive interactive GUI.

In some embodiments, the executable application 121a may be supported by the integration platform 110. Upon execution by the one or more processors 122, the executable application 121a may provide the one or more user devices 120 with access to one or more applications, services and/or resources of the integration platform 110, including the user-adaptive interactive GUI. This may include, among other things, displaying the user-adaptive interactive GUI on a display unit 123 of the one or more user devices 120, establishing communications between the integration platform 110 and the one or more user devices 120, transmitting user data or other data and information from or to the integration platform 110 and/or to other systems or devices (e.g., third-party computing systems 130), etc. In some embodiments, the executable application 121a may enable the users of the one or more user devices 120 to remotely collaborate with one another, via the user-adaptive interactive GUI, to perform one or more activities, such as setting up an account, electronically executing (e.g., e-signing) documents, opting-in or opting-out of agreement terms of service, initiating multi-party video communications, just to name a few.

Each of the one or more user devices 120 may include a display unit 123 configured to present interface elements to a corresponding user, and an input unit 124 configured to receive input from the corresponding user (e.g., in response to the interface elements presented through the display unit 123). In some examples, the display unit 123 may include, but is not limited to, an LCD display unit, a thin-film transistor (TFT) display, organic light emitting diode (OLED) display, a touch-screen display, or other type of display unit 123, and input unit 124 may include, for example, a keypad, keyboard, touchscreen, fingerprint scanner, voice activated control technologies, biometric reader, camera, or another type of input unit 124.

In some embodiments, the functionalities of the display unit 123 and input unit 124 may be combined into a single device, such as a pressure-sensitive touchscreen display unit that presents interface elements and receives input from a user. In some embodiments, at least one among the one or more user devices 120 may include an embedded computing device (e.g., in communication with a smart textile or electronic fabric), or any other type of computing device that may be configured to store data and software instructions, execute software instructions to perform operations, and/or display information on an interface device or unit.

The one or more user devices 120 may also include a communications interface 125, such as a wireless transceiver device, coupled to one or more processors 122 and configured to establish and maintain communications with communications network 140 via one or more communication protocols, such as WiFi®, Bluetooth®, NFC, a cellular communications protocol (e.g., LTE®, CDMA®, GSM®, etc.), or any other communications protocol. In some embodiments, the one or more user devices 120 may also establish communications with one or more additional computing systems (e.g., third-party computing systems 130) or devices (e.g., others among the one or more user devices 120) operating within the system 100 across a wired or wireless communications channel, such as communications network 140 (e.g., via the communications interface 125 using any appropriate communications protocol).

In some examples, at least one among the one or more user devices 120 may be associated with or operable by a user. Examples of the one or more user devices 120 may include, but are not limited to, any combination of mobile phones, smart phones, tablet computers, laptop computers, desktop computers, server computers, personal digital assistants, portable navigation devices, mobile phones, smart phones, wearable computing devices (e.g., smart watches, wearable activity monitors, wearable smart jewelry, glasses and other optical devices that include optical head-mounted displays (OHMDs)), embedded computing devices (e.g., in communication with a smart textile or electronic fabric), or any other computing device configured to capture, receive, store and/or disseminate any suitable data.

The one or more third-party computing systems 130 may include one or more servers (not shown) and one or more tangible, non-transitory memory devices (not shown) storing executable code, application engines, and/or application modules. Each of the one or more servers may include one or more processors, which may be configured to execute portions of the stored code, application engines or modules, and/or application programs to perform and/or provide one or more external applications, external services and/or external resources that may be accessed by the integration platform 110. In some embodiments, the external applications, external services and/or external resources may be cloud-based.

In order to store, maintain and access data and information, the one or more third-party computing systems 130 may include, within their respective one or more tangible, non-transitory memories, a data repository 131 that includes one or more databases and/or storage devices. The one or more third-party computing systems 130 may also include, within the one or more tangible, non-transitory memories, a respective applications repository 132 to facilitate the provision and execution of one or more respective applications, services and/or resources.

In operation, a user associated with a user device 120 (e.g., mobile phone, desktop computer, laptop, tablet, etc.) may connect to an online concierge service that provides access to, among others, the integration platform 110 via a web browser displayed on a display unit 123 of the user device 120, for example. Upon accessing the online concierge service, the user may be prompted (e.g., via a prompt message displayed by the web browser on the display unit 123 of the user device 120) to enter universal log-in credentials (e.g., for accessing services and functions accessible through the online concierge service) or log-in credentials specifically pertaining to the integration platform 110. In some embodiments, the user's log-in credentials may be automatically pre-populated (e.g., from the user device's memory 121) in a designated log-in area (within the web browser) in response to the log-in prompt.

Alternatively, the user may connect to the integration platform 110 via a software application 121a that resides directly on the user device 120 or that may be accessed through a cloud service provider, for example. Once the software application 121a is launched (e.g., in response to user input), the software application 121a may prompt the user (e.g., via a prompt message generated by the software application 121a and displayed on the display unit 123 of the user device 120) for log-in credentials. In some embodiments, the log-in credentials may be pre-populated (e.g., from the user device's memory 121) in a designated log-in area (within the display unit 123 and generated by the software application 121a) in response to the log-in prompt.

Once the user's log-in credentials have been entered into the designated log-in area and submitted (e.g., responsive to user input to via the input unit 124), the user's log-in credentials may be transmitted, via communication interface 125 over a communications network 140, to the integration platform 110 for processing by the SSO module 117a. In some embodiments, the user's log-in credentials may comprise one or more of a username and password, biometric data, voice data, and/or any other authentication information.

Upon receiving the log-in credentials, the SSO engine 117a may perform authentication and authorization functions, such as evaluating the received log-in credentials based on log-in credentials stored in the user database 114, obtaining authorization level data associated with the received log-in credentials (e.g., from the user database 114), and returning an authentication and authorization response. If the log-in credentials are authenticated, access to the integration platform 110 may be granted in accordance with the user's authorization level. Alternatively, if the log-in credentials are not authenticated, the SSO engine 117 may return (e.g., via the communications network 140) an access-denial response and/or a prompt to re-enter the log-in credentials.

Once the user is authenticated and has successfully logged-in to the integration platform 110 (or if the user attempts to access applications, services and/or resources of the integration platform 110 without first logging-in), attempts to access the certain applications, services and/or resources provided by and/or accessed through the integration platform 110 may result in further authentication requests being received by the SSO engine 117a, such as from service provider(s) associated with the applications, services and/or resources (e.g., components of the integration platform 110, third-party computing systems 130, etc.). These authentication requests may be processed by an identity provider (IdP) component (not shown) of the SSO engine 117a, which may involve responding to the authentication requests with data comprising the log-in credentials and/or authorization level(s) associated the user. The service provider(s) may then process the responses and, if the authentication is successful, the service provider(s) may then grant the user access to the certain applications, services and/or resources in accordance with the user's authorization level(s).

Upon successfully logging-in to the integration platform 110, the digital gateway module 115b and/or service portal module 115c may automatically generate one or more digital gateways and/or service portals, respectively, to facilitate access to any of the applications, services and/or resources to which the user is subscribed and/or is authorized to access, including the user-adaptive interactive GUI.

In some embodiments, successfully logging-in to the integration platform 110 automatically launches the user-adaptive interactive GUI, while in other embodiments, a prompt (e.g., from user device 120) may trigger the application GUI module 115a to generate, update and/or display the user-adaptive interactive GUI in the display unit 123 of the user device 120.

As further discussed below, the user-adaptive interactive GUI may include any number of selectable icons, widgets and/or input regions, each for providing access to one or more of the services, internal resources and/or external resources provided by and/or through the integration platform 110. In some embodiments, the user-adaptive interactive GUI may also include personalized data and information that is specific to the business client and/or user, such as alerts, user-specific notices and suggestions, data streams, contacts, prior interaction data, links to services previously requested or frequently used, predictive and/or suggested data and information, etc., and/or general (non-user specific) data and information (e.g., date, time, non-user-specific notices and recommendations, etc.).

Upon selecting any of the selectable icons, providing other input into any of the input regions (e.g., data followed by a submission command) and/or otherwise initiating a prompt, the selection, other input and/or prompt may be received by the integration platform 110. In response, the integration platform 110 may initiate one or more of the services and/or resources implicated by the selection, other input and/or prompt. This may include, for example, invoking the SSO module 117a to first confirm that the user making the selection and/or providing the other input or prompt is authenticated and authorized to access to the services and/or resources, and then (upon authenticating and authorizing the user), granting such access.

In some embodiments, the particular combination of selectable icons, widgets, input regions and/or data and information displayed on the user-adaptive interactive GUI, as well as their overall configuration (e.g., arrangement, size, relative location, etc.), may be intelligently determined, specifically for the user, by the integration platform 110. For example, each time a user accesses and/or interacts with the integration platform 110, the data monitor 115e may monitor and capture data and information associated with such access and interactions (e.g., interaction data 114b), including in real-time as the access/interactions are occurring (e.g., the user activity). The interaction data 114b may include, for example, selections, input, requests, queries, responses to prompts, search terms, length and/or frequency of interactions, types services and/or resources invoked, geo-location of device(s) used to access the integration platform 110, type of data downloaded and/or uploaded, and so on.

The data monitor 115e may also capture user profile data 114a, such as user preferences and other user-specific data, as well as historical data. The historical data may include, for example, historic interaction data 114b (e.g., captured during prior interaction sessions between the user and the integration platform 110), historic client and business relationship data, and/or historic user profile data 114a (e.g., obtained from the user's user device 120 and/or the third-party computing systems 130). In some embodiments, the data monitor 115e may be further configured to capture user profile data 114a and historical data of both the user, and that of other users having similar and/or comparable profile, interaction, and/or any other type of characteristics, so as to create a more comprehensive and robust data set for machine learning modeling, discussed below. To do this, the machine learning module 115d (discussed below) may be configured to identify a group of users sharing similar and/or comparable characteristics, which the data monitor 115e may, in turn, monitor each time a user from among the group interacts with the integration platform 110.

The real-time and/or historic data and information captured and/or accessed by the data monitor 115e may then be provided to the machine learning module 115d as input for training, validating, and/or testing one or more machine learning models, and/or for executing/deploying the one or more machine learning models (e.g., for modeling). That is, the machine learning module 115d may execute one or more machine learning models to generate tendency data 114c (advanced behavior/tendency analytics) for a particular user. The generated tendency data 114c may be based on the real-time and/or historic data and information relating to that user, and/or on data and information relating to a group of users having similar and/or comparable characteristics (e.g., profiles, tendencies, etc.), as noted above. In some embodiments, previously determined tendency data 114c (associated with the user and/or with the group of users) may be included in the machine learning models and used to generate/update the previously determined tendency data 114c. Similarly, the machine learning models may continually update the group of users to reflect then-current similarities and/or compatibilities.

Once determined, the tendency data 114c may be used to determine, predict and/or suggest current and/or future user interaction requirements and tendencies of the particular user. For example, the adaptive GUI module 115a may utilize the tendency data 115a, alone or in combination with profile data 114a, interaction data 114b and/or other types of data 114n, to generate, customize and/or tailor (e.g., directly or by signaling the one or more user devices 120 to generate, customize and/or tailor) current and/or subsequent interactions between the user (via the user's device 120) and integration platform 110 (via the user-adaptive interactive GUI). This may include, for example, dynamically modifying the user-adaptive interactive GUI on the fly, specifically for the user, as the user interacts therewith. The dynamic modifications may include, for example, rearranging elements and/or features of the user-adaptive interactive GUI in a manner that reflects the user's evolving preferences, tendencies, etc., all while the user is engaged in an active session with the user-adaptive interactive GUI. To accomplish this, the machine learning module 115d may be configured to execute the one or more machine learning models during active user interaction sessions, with data and information captured during the active interaction sessions provided as input to the machine learning models, as explained above. Output from the machine learning models may then be utilized by the adaptive GUI module 115a to dynamically update the user-adaptive interactive GUI.

Similarly, modifications to the user-adaptive interactive GUI may be made in the absence of an active session with the user-adaptive interactive GUI (e.g., when the user is logged-off), e.g., by executing the one or more machine learning models and utilizing the modeling output (by the adaptive GUI module 115a) to initiate such modifications. Upon engaging in a subsequent active session (e.g., re-launching the user-adaptive interactive GUI), an updated customized and tailored version of user-adaptive interactive GUI may be rendered and presented to the user. In this manner, the user-adaptive interactive GUI is able to provide access to a unique combination of digital interaction, communication and integration platform 110 capabilities (e.g., services and our resources) that is customized and tailored to each individual user, all on a single GUI.

In some embodiments, the tendency data 115a may also be used by the integration platform 110 to create anticipatory links and/or connections to services, functions, applications, resources, etc. on behalf of the particular user, so as to reduce latency times associated with creating such links and/or connections.

In some embodiments, the machine learning module 115d may utilize one or more machine learning models to predict future user activity and/or to trigger a user-adaptive interactive GUI to display a prompt or instructions for the user to interact with the user-adaptive interactive GUI in a particular manner. For example, the machine learning module 115d identify a service and/or resource that the user may be interested in at a future time interval. Based on such determinations, the adaptive GUI module 115a may cause a prompt, interface element and/or feature associated with the identified service and/or resource to present or display on the user's user-adaptive interactive GUI.

In some embodiments, the machine learning module 115d may utilize a first machine learning model to update and refine one or more other machine learning models and/or associated training data. For example, machine learning module 115d may provide as input to the first machine learning model data captured and/or accessed by the data monitor 115e. This first machine learning model may be configured to further refine the one or more other machine learning models that are configured to determine, for example, which interface elements or features are most important to the monitored user(s), and update training data associated with one or more other machine learning models accordingly. In some embodiments, one or more among the machine learning models may be configured to enhance security protocols and/or further reduce latency in communications (e.g., between the user devices 120, third-party computing systems 130 and the integration platform 110), for example, by modeling and identifying security vulnerabilities and/or optimal communication paths.

In some embodiments, the machine learning module 115*d* may be configured to evaluate a performance of one or more machine learning models over time. Then, depending on the performance evaluation, the machine learning module 115*d* may update and/or retrain one or more of the machine learning models. The performance of the machine learning may comprise a measure of one or more performance metrics (e.g., accuracy, utilization rate, etc.). Retraining the one or more machine learning models may include iteratively adjusting one or more parameters (e.g., weights) of an objective function of the machine learning model(s) until the performance of the machine learning model(s) reaches a predetermined performance threshold.

Figure 2:
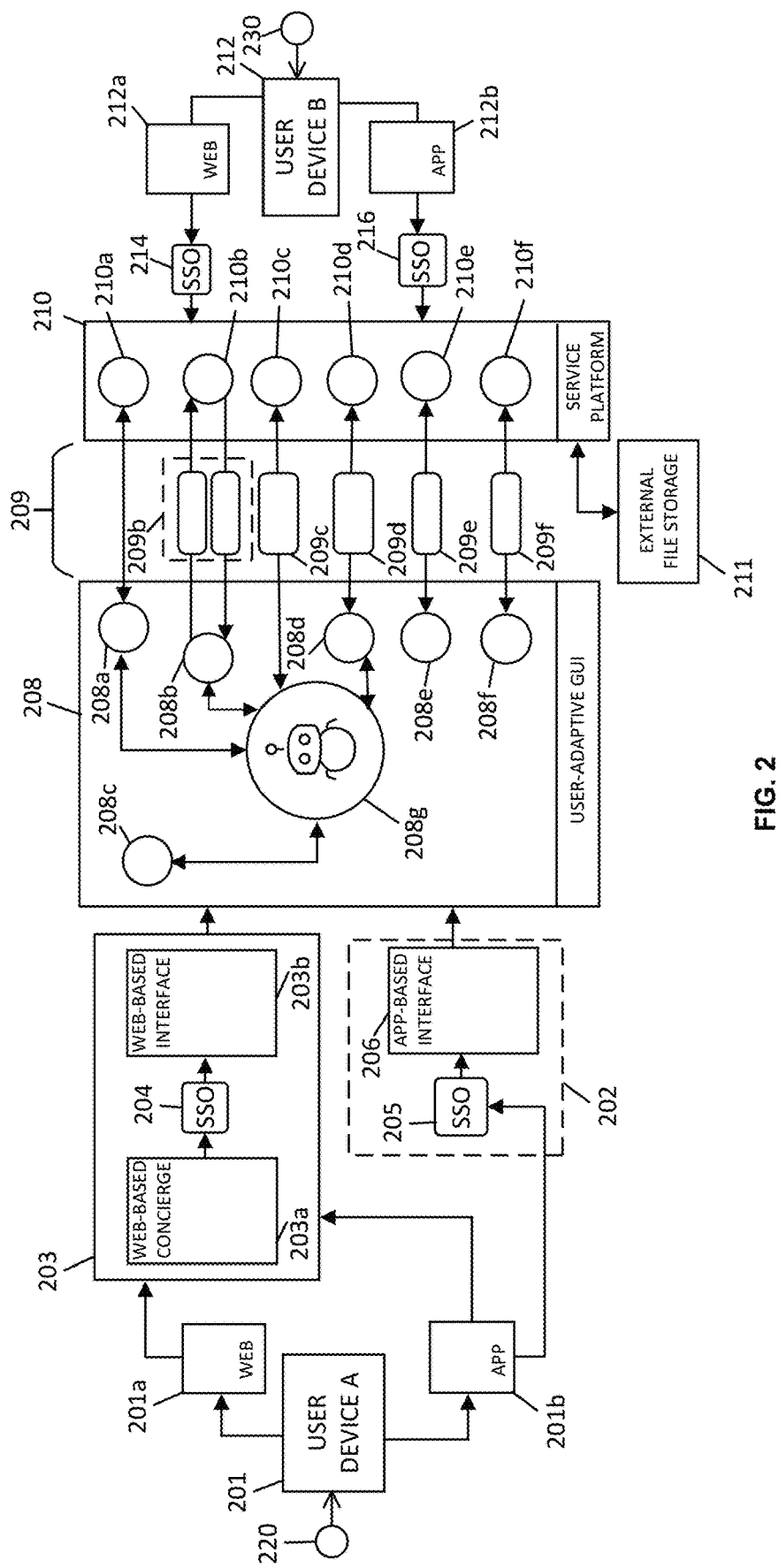
FIG. 2 illustrates an exemplary networked environment according to the present disclosure.

Turning now to FIG. 2, exemplary features and functions operating in a networked environment 200 according to the present disclosure is shown. In this example, the networked environment 200 includes multiple categories of user devices (e.g., user device A 201 and user device B 212) and a combination of applications, services, internal resources and external resources provided by and/or through an integration platform according to the present disclosure (integration platform not shown in FIG. 2; see FIG. 1 for exemplary integration platform 110). The first category of user devices (e.g., user device A 201) may comprise any type of device associated with an end-user 220, where the end-user 220 may comprise a client and/or consumer of the integration platform, for example. User device A 201 may also be referred to herein as simply "user device 201." The second category of user devices (e.g., user device B 212) may comprise any type of device associated with a platform-side user 230. User device B 212 may also be referred to herein as a "platform-side user device 212." As will be discussed below, a platform-side user 230 may include any user that provides and/or enhances services and/or resources to the end-user 220, in combination with and through the integration platform.

As discussed above, the end-user 220 may connect to and access the integration platform (not shown in FIG. 2) via a web-based connection 203 and/or an app-based connection 202. The web-based connection 203 may involve connecting, via a web browser 201*a* displayed on a display unit of the user device 201, to an online concierge service 203*a* that provides access to, among others, the integration platform. Upon accessing the online concierge service 203*a*, the end-user 220 may be prompted (e.g., via a prompt message displayed by the web browser 201*a* on the user device 201) to provide log-in/access credentials (e.g., for accessing services and functions accessible through the online concierge service 203*a*) in a designated area within the web browser 201*a*. In some embodiments, all or portions of the log-in/access credentials may be automatically prepopulated in the designated area. Upon receiving the log-in credentials, an SSO engine 204 of the integration platform may perform authentication and authorization functions, and if the end-user 220 and/or the end-user's device 201 is authenticated, access to the integration platform may be granted via, for example, a web-based interface 203*b*.

Additionally or alternatively, the end-user 220 may connect to and access the integration platform via an app-based connection 202. The app-based connection 202 may involve launching a software application or "app" 201*b* that resides directly on the user device 201 and/or that may be accessed through a cloud service provider, for example. Once the software application 201*b* is launched (e.g., in response to user input), the software application 201*b* may prompt the user (e.g., via a prompt message generated by the software application 201*b* and displayed on a display unit of the user device 201) to provide log-in/access credentials in a designated area. In some embodiments, the log-in/access credentials may be automatically pre-populated in the designated area. Upon receiving the log-in credentials, an SSO engine 205 of the integration platform may perform authentication and authorization functions, and if the end-user 220 and/or the end-user's device 201 is authenticated, access to the integration platform may be granted via, for example, an app-based interface 206. Notably, the SSO engines 204, 206, 214, 216 shown in FIG. 2 may comprise a same or multiple SSO engines.

Once the end-user 220 is authenticated and granted access to the integration platform, the integration platform may generate one or more digital gateways and/or service cloud portals, respectively, to facilitate access to any of the applications, services and/or resources to which the end-user 220 is subscribed and/or is authorized to access, including the user-adaptive interactive GUI 208.

In some embodiments, successfully logging-in to the integration platform automatically launches the user-adaptive interactive GUI 208, while in other embodiments, a prompt (e.g., from user device 201) may trigger the integration platform to generate, update and/or display the user-adaptive interactive GUI on a display unit of the user device 201.

The user-adaptive interactive GUI 208 may include any number of selectable icons, widgets, input regions, etc., each for initiating and/or providing access 209*b-f* to one or more of the services, applications, and/or resources 210*a-f*, 211 provided by and/or through the integration platform via, for example, one or more service platforms 210. In some embodiments, the user-adaptive interactive GUI 208 may also include a personalized data and information that is specific to the user, such as alerts, user-specific notices and suggestions, data streams, contacts, prior interaction data, links to services and/or resources 210*a-f*, 211 previously requested or frequently used, predictive and/or suggested data and information, etc., and/or general (non-user specific) data and information (e.g., date, time, non-user-specific notices and recommendations, etc.

In this example, the user-adaptive interactive GUI 208 includes an exemplary combination of selectable icons, which includes a knowledge icon 208*a*, a cases icon 208*b*, a chat icon 208*c*, a meetings icon 208*d*, a contact us icon 208*e*, a files icon 208*f*, and most prominently, an AI-driven bot icon 208*g*. However, this combination of icons 208*a-g* represents but one illustrative example. Indeed, the user-adaptive interactive GUI 208 may comprise more, fewer and/or different icons, including multi-task/multi-service icons. In some embodiments, the user-adaptive interactive GUI 208 may include a combination of icon(s) and avatar(s) (not shown) and/or any voice/typing input/output interface(s). Examples of other icons may include, without limit, a document sharing icon, an electronic-signature icon, a native chat to video chat meeting icon, etc. The user-adaptive interactive GUI 208 may also include an avatar/digital personality overlay, giving aspects of the interactive interface 208 a visual representation.

Moreover, although the icons 208*a-g* are shown having a particular arrangement and/or size, it should be understood that the icons 208*a-g* may be arranged and sized in any manner. As discussed above, the icons 208*a-g* may be arranged and/or sized (e.g., via machine learning modeling, discussed above) according to how frequently the end-user 220 accesses the icons 208*a-g*. For example, icons 208*a-g* that are most frequently used by the end-user 220 may be displayed most prominently and in a location that is easy for the end-user 220 to access.

Further, if the end-user (or users generally) 220 has a tendency to use certain icons 208a-g together, those icons 208a-g may be arranged close to each other, so as to facilitate the end-user's 220 access of the same. For example, if the end-user 220 is determined (e.g., via machine learning modeling, discussed above) to have a tendency to use the chat icon 208b and the meetings icon 208c together (e.g., to schedule multi-party communication sessions), those icons 208b-c may be positioned together on the user-adaptive interactive GUI 208.

In operation, selecting any of these icons 208a-g (or selecting one or more options returned by the advanced chat bot 208g, discussed below, and/or providing predefined user input (e.g., voice, typing, etc.)) may cause then cause the integration platform to initiate and/or provide the end-user 220 with access to any of the underlying services and/or resources 210a-f, 211 pertaining to the selected icon, widget, option user, user input, etc. For example, selecting the knowledge icon or widget 208a may cause the integration platform to grant the user direct access to a service platform 210 that hosts and/or provides access to an information resource 210a that provides articles and information in a searchable format, and selecting the cases icon or widget 208b may cause the integration platform to launch and/or provide access 209b to create/view case resources 210b, which may be native to the integration platform. Similarly, selecting the chat icon 208c may initiate or connect 209c to communication resource 210c, such a live chat session with a platform-side user 230 through the integration platform; selecting the meetings icon 208d may launch 209d a meeting scheduler resource 210d that includes electronic communications being transmitted to invitees; selecting the contact us icon 208e may launch 209e a voice call resource 210e involving the end user 220 and a platform-side user 230; and selecting the file icon 208f may initiate 209f file transfer functions 210f, which may invoke external file storage resources 211. The services and resources 210a-210f invoked by the exemplary icons 208a-208g may reside in on one or more platforms 210, as well as in one or more service clouds, in one or more third-party computing systems, and/or be native to the integration platform itself.

In addition to displaying icons, the user-adaptive interactive GUI 208 may include other types of data and information, as noted above. This may include, for example, personalized user-profile information, notifications, 'my team' information (e.g., dedicated service providers of a specific client entity or end-user 220), marketing content, next best advice content, and any other type of data and information selected by the end-user 220 and/or determined by the integration platform on behalf of the end-user 220.

In some embodiments, the end-user's 220 historical interactions (and/or historical interactions of other users with similar profiles and/or characteristics) with the integration platform may be captured, saved and modeled so as to predict future interactions. For example, if the end-user 220 frequently searches for articles (e.g., via the knowledge icon 208a) pertaining to 'green energy,' the integration platform may, via its machine learning modeling capabilities, determine and proactively push links to 'green energy' articles to the end-user's 220 user-adaptive interactive GUI 208, without the end-user 220 having to actually request via search or selecting the knowledge icon 208a. Additionally, the integration platform may generate suggestions based on the end-user's 220 historical interactions and present the suggestions, in an actionable format, to the end-user 220 via the user-adaptive interactive GUI 208.

In addition to providing access to system-based or cloud-based services and/or resources 210a-f, 211, the integration platform may also provide intelligent and real-time access to human-based resources, such as platform-side user 230 and/or platform-side user device 212. As discussed above, platform-side user 230 may include any user that directly or indirectly provides, supplements and/or enhances services and/or resources to the end-user 220, through and/or in combination with the integration platform.

The platform-side user 230 may connect to and access the integration platform from the platform-side user device 212 via, for example, a web-based connection 212a and/or an app-based connection 212b. The web-based connection 212a may involve connecting, via a web browser displayed on the platform-side user device 212, to the integration platform, submitting log-in/access credentials via the web browser, and authenticating and authorizing, by an SSO engine 214, the platform-side user 230.

Connecting to and accessing the integration platform via an app-based connection 212b may involve, for example, launching a software application or "app" that resides directly on the platform-side user device 212 and/or that may be accessed through a cloud service provider, submitting log-in/access credentials via the app, and authenticating and authorizing, by an SSO engine 216, the platform-side user 230.

Once authenticated, the platform-side user 230 may be granted access to the integration platform, as well as to various services and resources 210a-f, 211 available by or through the integration platform. The services and resources 210a-f, 211 may include those very services and resources 210a-f, 211 accessed by the end-user 220, in which case the platform-side user 230 may provide, supplement and/or enhance the same. For example, selecting, by the end-user 220, the chat icon 208c may initiate or connect 209c the end-user 220 to a live chat session 210c with the platform-side user 230 through the integration platform. In this manner, the platform-side end user 230 may enhance the live chat 210c resources provided by the integration platform.

Figure 3:
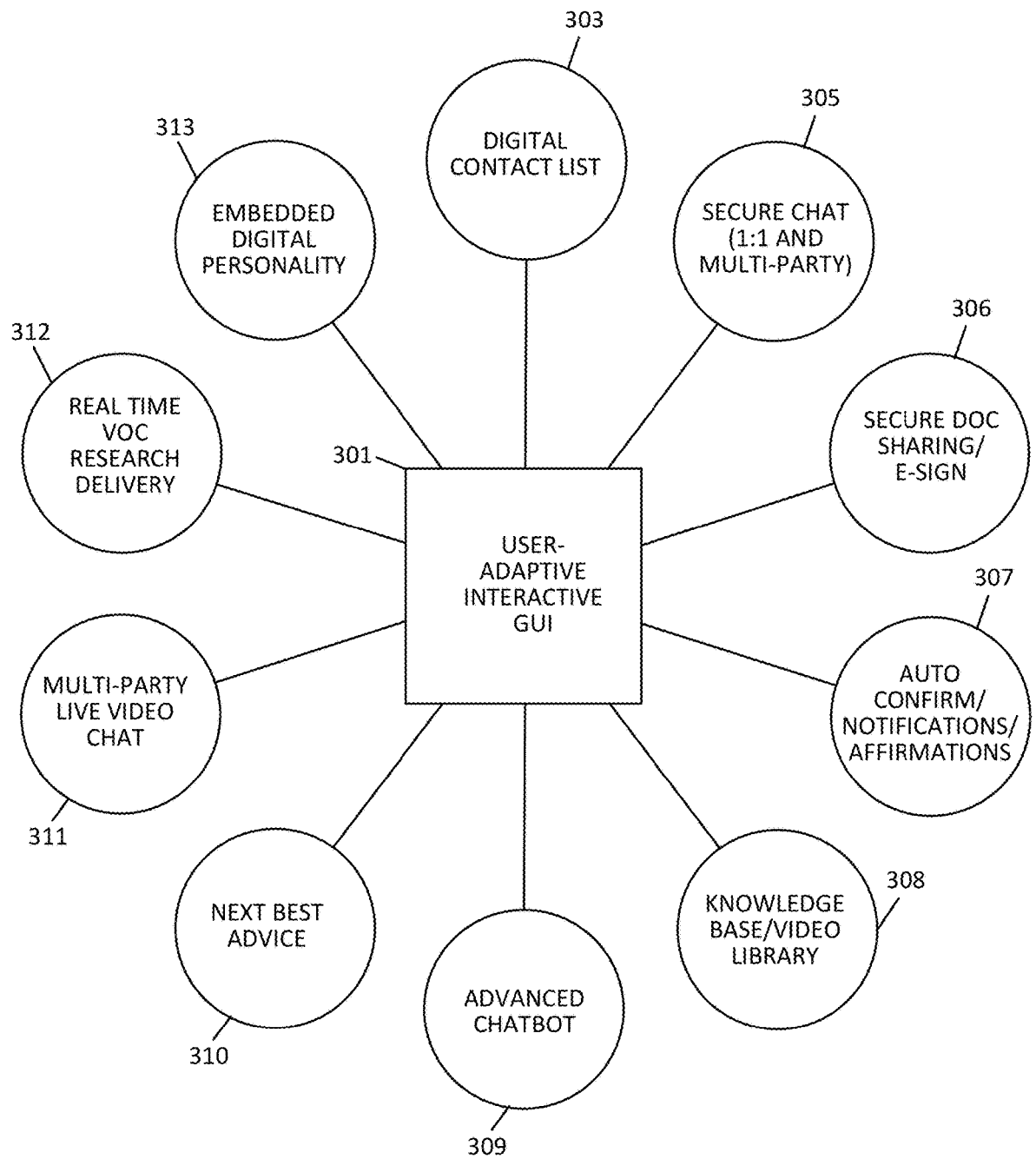
FIG. 3 illustrates an exemplary diagram showing a combination of integrated services and resources that may be accessible through an interactive graphic user interface (GUI) according to the present disclosure.

Turning now to FIG. 3, an illustrative diagram 300 showing a sampling of exemplary services and/or resources 303-313 that may each be accessed and/or initiated via a user-adaptive interactive GUI 301 is shown. The exemplary services and/or resources 303-313 may be provided directly and/or indirectly by an integration platform configured according to this disclosure (integration platform not shown in FIG. 3). It should be noted, however, that additional and/or alternative services and/or resources may also be integrated into an integration platform of the present disclosure and accessed and/or initiated by the user-adaptive interactive GUI 301 shown in FIG. 3.

As discussed above in connection with FIG. 2, each of the exemplary services and/or resources may be accessed and/or initiated by selecting a corresponding selectable icon, selecting one or more selectable options returned by the user-adaptive interactive GUI 301 (e.g., responsive to one or more user actions), providing predefined user input (e.g., voice, typing, etc.) to the user-adaptive interactive GUI 301, and/or automatically (e.g., initiated by the integration platform responsive to predictive machine learning modeling output). Responsive to accessing and/or initiating any of the exemplary services and/or resources 303-313, the integration platform may execute computer readable instructions to directly provide and/or indirectly provide (e.g., from third-party computing systems) access to features, functions, operations, etc. associated with the respective services and/or resources 303-313. Further details of each of the exemplary services and/or resources 303-313, including aspects of their respective functions, features and operations, are provided below. Notably, the terms 'internal' and 'external' as used in the following descriptions are relative to the integration platform. Thus, 'internal data repositories', for example, refers to data repositories that are a part of and/or directly accessible by the integration platform; whereas 'external data repositories,' for example, refers to data repositories that are not a part of the integration platform, but may instead be a part of and/or controlled by third-party computer system(s).

Digital Contact List. The digital contact list resource 303 may be configured to provide users (e.g., end-users and platform-side users (e.g., service representatives) associated with the integration platform) with full access to a list of all their respective allowed and most frequent contacts in a single interface. From there, the digital contact list resource 303 may serve as a direct launching point to initiate other services and/or resources that may involve the users' contacts (e.g., initiate 1:1 or group messaging, share documents, initiate voice calls, video chats, co-browse files, schedule an appointment, etc.). That is, the digital contact list resource 303 may itself comprises generating one or more embedded contact list interfaces comprising icons, links, etc. for accessing/launching other resources from within the digital contact list resource 303 interface. Selecting such icons, links, etc. from an embedded contact list interface may then trigger the integration platform to execute instructions for accessing and/or launching the other resources.

The digital contact list resource 303 may also be configured to enable end users to search within the integration platform's organization (e.g., for platform-side user(s)) via a search/pop-up box, and to provide details such as titles and roles, and other information associated with end-user contacts. In some embodiments, the information and data accessible through the digital contact list resource 303 may be accessed via a data connection (e.g., a live data feed) between the user-adaptive interactive GUI 301 and one or more internal and/or external data repositories that match details from internal directory services (e.g., identity provision services and active directory services) and internal or external hosted contact lists that define various types of platform-side users (e.g., client representatives, deal/service teams for specific clients, etc.).

Secure Chat. The secure chat resource 305 (which may also be referred to as a communications resource) may comprise a fully-persistent 1:1 and/or multi-party secure text chat interface capability that enables users to initiate and remain engaged in persistent, ongoing conversations with other users, and/or to initiate voice calls and/or direct video chat sessions with the other users. The users may be end-users, platform-side users and/or a combination of both. All users accessing this secure chat resource 305 may all be engaged and notified (e.g., via a secure chat resource 305 interface) of new messages or updates to the conversation over time, and users within authorized relationships (e.g., users authorized to connect and communicate with each other using the secure chat resource 305) may be added or removed from conversations at any time. This resource 305 may also include functionality to launch one or more other resources available through the user-adaptive interactive GUI 301, directly from within the secure chat resource 305 interface. For example, a chat between multiple users may mention a need to 'e-sign' a document. The integration platform may, by monitoring the chat (e.g., via data monitor) and modeling information from the chat (e.g., via a machine learning engine), determine that a document needs to be e-signed, and in response, automatically initiate an e-signature resource 306 (discussed below), provide access to the e-signature resource directly from the secure chat resource 305 interface, and/or generate a prompt or request to upload the documents that is to be e-signed, for example.

Alternatively or additionally, simply adding or uploading a digital file or the document to the chat conversation (e.g., via a drag-and-drop, cut-and-paste, or other function(s)) may cause the integration platform to launch the e-signature resource 306. Other features, such as securely sending documents, receiving confirmations, scheduling an appointment, co-browsing, making a call, etc., may also be initiated directly from within this resource 305. All of the communications may be secured via enhanced (e.g., government grade) encryption protocols, ensuring data in flight and at rest is protected.

Secure Doc Sharing/E-Sign. The secure document sharing/e-sign resource 306 may be configured to enable users to upload (e.g., via drag-and-drop, cut-and-paste, or other function(s)) digital documents (e.g. digital forms, files and/or documents requiring signature) via, for example, the secure chat resource 305 interface discussed above, or within a dedicated upload page included in an interface of this secure doc sharing/e-sign resource 306. Once uploaded, the digital documents may be routed to one or more users, actioned and/or e-signed by the one or more users, and if needed, routed other user(s) that may need to review and/or take action in connection with the digital documents. For example, if a digital document includes a request for an authorization, the digital document may be routed, by the integration platform, to an appropriate platform-side user for review and/or approval (e.g., via e-signing). Similarly, if the digital document comprises a request for a service, the digital document may be routed to the appropriate system and/or service provider to authorize and initiate the requested service. Optionally, this resource 306 may be configured to enable users to take an image or video of their documents (e.g., by launching a camera feature of a user device from which this resource is being accessed) to be uploaded. In this example, the secure doc sharing/e-sign resource 306 may include an integrated electronic signature resource that enable users to both upload, share and e-sign the documents all from the same interface. In some examples, the e-signature resource 306 may comprise its own, stand-alone resource.

Auto Notifications/Confirmations/Affirmations. The auto notification/confirmations/affirmations resource 307 may be configured to enable users to receive automated notifications, alerts, messages, etc., in real-time or near real-time, within the user-adaptive interactive GUI 301. The confirmations may relate to the initiation, progress and/or completion of any of the many other features, functions and operations provided by the integration platform. For example, an auto-confirmation may comprise generating an alert message and providing access to the alert message (e.g., via an actionable icon or link) from the user-adaptive interactive GUI 301 (or within an interface generated for this resource 307). The alert message may advise an end-user that one or more of the end-user's transactions (e.g., initiation of a trade, wiring of a payment, etc.) has been completed. The notifications, alerts, messages, etc. may be customized based on the end-user's role and preferences and/or learned by the integration platform based on historical user interactions of the end-user and/or of one or more additional end-users). In addition, the notifications, alerts, messages, etc. may be informational (e.g., "the system is unavailable", "performance is degraded", etc.) and/or actionable (e.g. "click here to approve/confirm/release this queued payment", which includes an underlying link that, when selected, initiates one or more routines or programs). API connections to components of the integration platform may be used to deliver key/pre-determined notification and confirmation data to end-users.

Knowledgebase/Video Library. The knowledgebase/video library resource 308 may comprise one or more storage devices, memory and/or data repositories maintained by and/or accessible through the integration platform. This resource 308 enables users (end-users and/or platform-side users) to access a library of knowledge articles, videos, photos, images, documents, and other content. The content may be categorized and indexed in a robust way, enabling users and/or the integration platform to quickly and efficiently find desired content via a search function. In some embodiments, this resource 308 may employ machine learning to develop advanced analytics to predict and/or proactively suggest content (or push-up content to a top of search results) based on a user's own role, systems and data access, and historical interactions with the user-adaptive interactive GUI 301 and/or other resources (and/or on the interactions of other users). In addition, this resource 308 may be configured to continue to evolve as new content becomes available. Further, content may be promoted/featured based on a specific product/service mix that a user has active during a current interaction session with the integration platform (e.g., if an end-user has a 'case' (e.g., product, service, and/or information request) open for System B, the end-user may see more System B content being featured via the knowledge base/video library resource 308). Further still, search results and/or content may be tailored, limited, enhanced, filtered, or otherwise customized according to a user's preferences and/or system-determined tendencies, and the content may be accessed from any number of internal and/or external content depositories and/or directories.

In some embodiments, the knowledge base/video library resource 308 may include embedded logic that automatically initiates (and/or suggests) a connection and/or interaction with a platform-side user (e.g., a representative). For example, if an end-user spends a predetermined amount of time searching for content without selecting, downloading, opening, or otherwise accessing any search results, the embedded logic of this resource 308 may automatically connect the end-user with a platform-side user (e.g., via a live chat or voice call resource) to assist the end-user with finding information.

Advanced Chat-bot. The advanced chat-bot resource 309 comprises an automated, AI/ML rules engine (e.g., hosted by the integration platform) configured to provide users with unlimited access (e.g., 24 hours per day/7 days per week) to a conversational message-based dialogue that processes user input (e.g., in the form of a question or request) and quickly responds with a resolution (e.g., an answer, a suggested course of action, route user to other system function(s), provide/display selectable features such as links, icons, and the like, etc.). Unlike conventional chat-bots, this resource provides users with personalized information and customized suggestions designed to interpret the way individual users query its search function, and learn from those experiences. To do this, the AI/ML rules engine may be configured to capture and model user-specific and aggregated interaction and profile data to generate advanced analytics for each particular user, which in turn may be used to generate user-specific responses and suggestions. This includes, for example, capturing and modeling (current and/or historic) user-specific queries and user-specific reactions and sentiments towards returned responses to identify user-specific tendencies that inform how user-specific queries should be interpreted. User sentiments may be defined by the extent to which the user utilizes, accepts and/or rejects the returned responses. As the user-specific reactions/sentiments evolve, so too may the rules for interpreting the user-specific queries. Thus, different users submitting a same inquiry may receive completely different responses. In some embodiments, this resource 309 may be supported by a large language model (LLM) with access to a corpus of all types of relevant data (e.g., current business data, financial theory, practice guides, etc.) that, when modeled, returns multiple advisory points and/or output formats through an advanced chat-bot interface.

In some embodiments, this advanced chat-bot resource 309 may include embedded logic that automatically initiates (and/or suggests) a connection and/or interaction with a platform-side user (e.g., a representative). For example, if an end-user indicates that the advanced chat-bot resource 309 has not provided a satisfactory resolution (e.g., in response to a prompt from the real-time VOC feature, discussed below), the embedded logic of this resource 309 may automatically connect the end-user with a platform-side user (e.g., service representative) to assist the end-user.

In some embodiments, this resource 309 may be configured to parse and/or analyze data from user searches, inquiries, communications (e.g., e-mails, chat, etc.), requests, interactions, etc. to identify a suitable platform-side user to whom to auto-connect with the end-user (e.g., to identify a representative experienced in the particular topic the end-user is search for). Portions (e.g., key words) of the parsed data may be used as input to one or more machine learning models that may then identify, suggest or predict the suitable platform-side user(s).

Next Best Advice. The next best advice resource 310 may be configured to generate personalized recommendations, advice and/or suggested actions to users across any number of screens and/or functions on which the users may be interacting with the user-adaptive interactive GUI 301. As with other resources described herein, the next best advice resource 310 may utilize a machine learning engine to model user interaction and profile data (e.g., of one or more users) to develop advanced analytics. The advanced analytics may in turn serve as a basis for generating and providing personalized answers, recommendations, advice and/or suggested actions. In some embodiments, the user interaction and profile data may include (without limit) data relating to products or services a particular user is authorized to access, prior servicing history of the user, the user's account activity, user preferences, and other types of user-specific data. This resource 310 may also be configured to develop user-specific suggestions and recommendations (e.g., on topics that a particular user and/or class of users may be interested in), and auto-route the suggestions and recommendations to platform-side users who may in turn make service and/or product offerings to the particular user and/or class of users.

In some embodiments, the next best advice resource 310 may be configured to parse and/or analyze data from user inquiries, communications (e.g., e-mails, chat, etc.), requests, interactions, etc., and model (e.g., via the machine learning engine) the parsed data to identify a characteristics of a suitable platform-side user to whom to auto-route any suggestions, recommendations, advice, etc.

Multi-Party Live Video Chat. The multi-party live video chat resource 311 provides a further communications resource that may be initiated to connect multiple users (e.g., end users and platform-side users). For example, users (e.g., end users and/or platform-side service representatives) may invoke this resource 311 to initiate a multi-party video chat session (e.g., web-based, phone-based, etc.). Details and/or content from this resource 311 (e.g., duration, participants, etc.) may be captured and used to develop advanced analytics, which in turn may be used to enhance each user's interaction experience (e.g., by providing user-specific interactions, suggestions, etc.).

Notably, secure text chat sessions (e.g., initiated via the secure chat resource 305, discussed above) may comprise the ability to initiate a video chat session via a button available within the secure chat resource 305 interface that, when activated, launches the multi-party live video chat resource 311. This resource may use advanced (e.g., government standard) encryption protocols to secure the resulting conversation and video transmission.

Real-time "Voice Of Client" (VOC)/Research Delivery. The real-time VOC research delivery resource 312 may comprise a two-fold resource that enables users to proactively provide real-time feedback about their interactions and experiences with the user-adaptive interactive GUI 301 (or the integration platform at large) at any time (e.g., during live interactions) from any resource, feature or interface of the integration platform. This resource 312 may also be configured to automatically generate and display prompts for users to provide their live feedback while they are engaging with or after they have concluded using any of the many resources, features and/or functions described herein. The prompts may include, for example, smaller pop-up windows/widgets that appear on any of the pages/windows accessible through the user-adaptive interactive GUI 301 (e.g., chat bot, messaging module, during a video chat session, etc.), including on the interface's 301 "main page." Users may input their feedback via "freeform" text or by making selections to drop-down menus, click-boxes, and other input tools. Aspects of the system-generated feed-back prompts may be based on "active listening" technology, and AI based capability which monitors/listens to responses and generates prompts specific to user interactions to provide deeper and more comprehensive insights about the user interaction in question. For example, if a user types that "the video training library is incomplete" into a conversation text box, the active listening feature may respond within the conversation text box with a follow up question to elicit more detail: "We apologize that the video library is incomplete. What videos are missing that would help you?" Then the user could list particular product or topic videos that would have helped them resolve their issue.

A second aspect of this resource 312 may include platform-side insights/analytics about the feedback that each specific user has submitted (whether about the user-adaptive interactive GUI 301, services access through the interface 301, via device or browsing behaviors, or otherwise). This may include sentiment analysis, trends/themes, search requests, navigation paths, and any "red flag" topics a user has raised as an issue. These insights/analytics may be used to enhance user interactions (e.g., by updating interface/integration platform, based on machine learning modeling, to correct problematic issues, by providing more pertinent/useful recommendations and suggestions to users, etc.).

Embedded Digital Personality. The embedded digital personality resource 313 may be configured to represent the user-adaptive interactive GUI 301 through a "visual avatar" or personality that may resemble a human-being or some other caricature or branded mascot. As with other resources of the interface 301, the embedded digital personality resource 313 may utilize continual machine learning modeling to continually learn and improve to communicate and appear more 'human'. In some embodiments, this resource 313 may be configured to generate and display user-specific visual avatars, that talk, communicate, move, behave, etc. according to the tendencies, preferences, etc. of each particular user. In operation, rather than a user selecting any of the available resources, the digital personality resource 313 may be able to initiate, predict, select and/or otherwise make available any of the resources on behalf of the user.

As indicated above, the integration platform of the present disclosure may be configured to continually capture, catalogue and model user interaction and profile data, so as to continually improve the integration platform, improve the interactive interface and provide each user with a user-specific, customized interaction experience that evolves with each user. In some embodiments, one or more servers of the integration platform may be configured to use machine learning processes to learn (e.g., by training, modeling, validating, testing, and re-training machine learning models as new data and information becomes available) a user's tendencies as well as the tendencies of other users that may have similar profiles; and in turn, adapt the interactive user-adaptive interactive GUI 301, system-generated suggestions or recommendations, content, etc. to each specific user. In some examples, this may include actively and continually monitoring and capturing interaction and profile data associated with users of the integration platform, and storing that data in a database. A current user's interaction and profile data (including historic and/or current data) may also be captured to allow customization of the current user's profile, and/or combined with the data associated with one or more other users (e.g., those having similar profiles) to create training data. The training data may then be used to train one or more machine learning models as part of a machine learning process to generate analytics data. Portions of the captured data may also be used to validate and test the machine learning models prior to deployment, which may include repeatedly adjusting one or more model parameters (e.g., weight parameters) until an acceptable level of performance is achieved. The analytics data may, in turn, be used to update the interactive interface, automatically generate and display one or more suggestions or recommendations, prioritize content, tailor responses to user inquiries, and any of the other intelligent system functions describe herein. In some embodiments, a performance of one or more of the machine learning models may be evaluated against one or more performance metrics (e.g., accuracy, user sentiment, etc.), and if the performance falls below one or more pre-determined threshold parameters, a machine learning engine of the present disclosure may initiate a re-training of the one or more machine learning models.

Figure 4A:
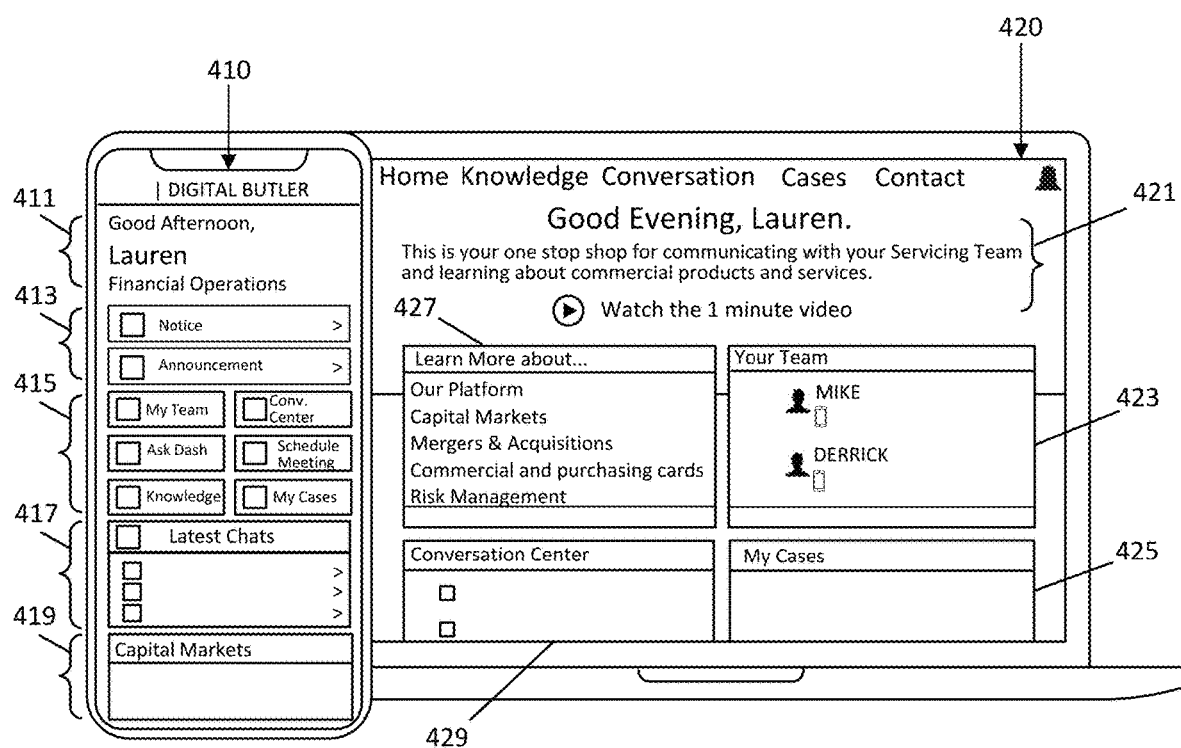
FIG. 4A illustrates exemplary interactive GUIs, each configured for a different user device, according to the present disclosure.

Turning now to FIG. 4A, exemplary embodiments of the user-adaptive interactive GUI 410, 420 are shown displayed on respective user devices 401, 403, with each comprising a different configuration (e.g., a different combination and arrangement of icons and regions), and each providing exemplary types of content. In some examples, the integration platform described herein may be configured to generate (e.g., via its adaptive GUI module) and transmit the interactive GUI to the user device(s) 401, 403 for rendering and display thereon, and in some embodiments, the integration platform renders the interactive GUI 410, 420 and transmit the rendered interactive GUI 410, 420 to the user device(s) 401, 403 for display thereon.

As described herein, an interactive GUI according to the present disclosure may include any number of input/display regions and/or selectable icons, each for providing access to one or more of the services, internal resources and/or external resources provided by and/or through the integration platform described herein. The interactive GUI may also include personalized data and information that is specific to each user, including alerts, user-specific notices and suggestions, data streams, contacts, prior interaction data, links to services previously requested or frequently used, predictive and/or suggested data and information, etc., and/or general (non-user specific) data and information (e.g., date, time, non-user-specific notices and recommendations, etc.). In some embodiments, certain of the input/display regions and/or selectable icons may also be personalized to display each user's name within the navigation and page titles associated therewith. For example, selecting 'My Team' or 'My Cases' within region 415 (discussed below) may generate one or more navigation windows personalized for the user (e.g., include the user's name). In addition, the interactive GUI may include other actionable features and functions, such as a free-form search area (e.g., for submitting search commands), make payment icons (e.g., to submit electronic payments), request live help icon (e.g., to connect with a live platform-side user), etc.

Upon selecting any of the selectable icons, providing other input into any of the input regions (e.g., data followed by a submission command) and/or otherwise initiating a prompt, the selection, other input and/or prompt may be received by the integration platform. In response, the integration platform may initiate one or more of the services and/or resources implicated by the selection, the other input and/or the prompt. This may include, for example, authenticating the user(s) and granting access to the one or more services and/or resources according to each user's level of authorization.

Referring again to FIG. 4A, a first exemplary interactive GUI 410 may be configured for a first type of user device 401, and include a first region 411, for displaying a greeting to a user. This greeting may be customized for the user to reflect the user's preferences, past interactions, learned user behavioral patterns (as modeled by the integration platform described herein), and other objective information (e.g., time of day, season, weather, etc.). In a second region 413, the first exemplary interactive GUI 410 may display interactive notices or announcements, including those that are user-specific. In this example, there are two notices/announcements provided as interactive dialogue boxes: one advising the user that approval is required to confirm a trade and the other providing an update regarding one of the user's cases (e.g., inquiries). In some embodiments, selecting (e.g., clicking) the interactive dialogue box(es) may activate an area within the interactive GUI 410 that enables the user to take any desired/requested action. For example, selecting a "Trade Confirm—Approval Required" dialogue box may open a window (within the interactive GUI 410) to enable the user to grant approval. In some embodiments, to preserve space, indications of notices and/or announcements may be provided via a selectable image icon (e.g., a bell, horn or other image with a number to indicate the number of notices/announcements) that, when selected, displays the notices and/or announcements as interactive dialogue boxes in a pop-up window, for example.

A third region 415 may include any number of selectable icons, each for invoking access to one or more of the services, internal resources and/or external resources provided by and/or through an integration platform according to this disclosure. As discussed herein, the selectable icons may be displayed, arranged, sized, etc. to reflect the types, frequency and tendencies of the user's interactions. As the user's interactions change, the display, arrangement, size, etc. of the selectable icons may automatically be updated accordingly.

Figure 4B:
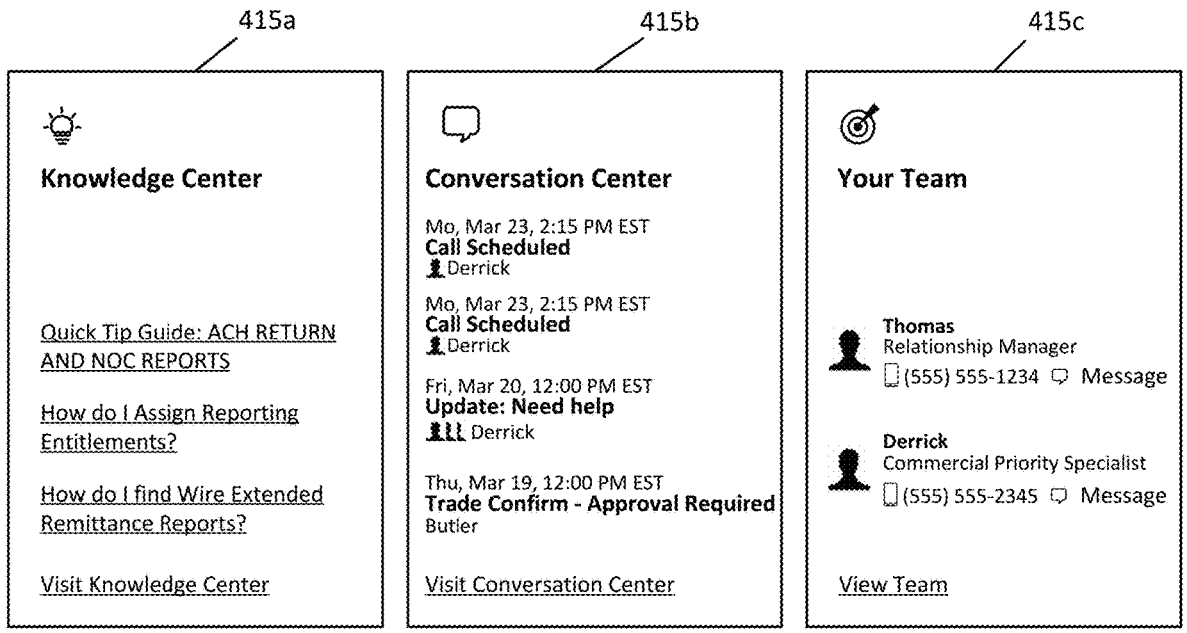
FIG. 4B illustrates exemplary windows or embedded interactive GUIs that include further details and features of certain resources shown in an exemplary interactive GUI of FIG. 4A

As noted above, selecting any of the selectable icons (e.g., in region 415) may invoke one or more services and/or resources. This may include, for example, generating a window that includes further details and further selectable options associated with a selected icon. Turning now to FIG. 4B, exemplary windows or embedded interactive GUIs 415a-415d that include further details and features of certain resources shown in the exemplary interactive GUI 410 of FIG. 4A are shown. For example, selecting a 'Knowledge Center' icon on the interactive GUI 410 of FIG. 4A may generate a 'Knowledge Center' window 415a that includes tips and suggestions, as well as a selectable link to launch the Knowledge Center service/resource. Similarly, selecting a 'Conversation Center' icon on the interactive GUI 410 generate a Conversation Center window 415b that includes a list of scheduled calls, links to prior interactions (e.g., conversations with platform-side uses) and/or a link to the Conversation Center service/resource (e.g., to launch a new interaction). FIG. 4B also shows an exemplary Your Team window 415c, that may be generated upon selecting the 'My Team' icon on the interactive GUI 410 of FIG. 4A. This window 415c may include contact details of multiple platform-side users with which the user may directly connect. A further exemplary window may include a Service Case window 415d, which may be generated upon selecting a 'My Cases' icon on the interactive GUI 410 of FIG. 4A. The Service Case window 415d may include fields for creating a new case, as well as a listing 416 of previously-opened cases. Selecting other icons and/or regions within any of the interactive GUIs described herein may similarly be configured to generate one or more additional windows that provide access to additional details and/or features (e.g., links, additional actionable icons, widgets, search functions, dialogue boxes, etc.) relating to one or more services and/or resources.

Also included in the first exemplary interactive GUI 410 is region 417 that provides access to the user's latest chats. In a fifth region 419, the first exemplary interactive GUI 410 displays information from a knowledge base (e.g., from one or more internal and/or external resources) that may be of interest to the user, as determined by the integration platform (e.g., based on prior user interactions) and/or as identified according to the user's preferences. This region 419 may also include platform-generated (e.g., via machine learning modeling) predictions and/or suggestions based on prior and/or current user interactions.

A second exemplary interactive GUI 420 may be configured for a second type of user device 403, and include a first region 421 for displaying a greeting to the user, a second region 423 for providing access platform-side users (e.g., as determined by the integration platform based on user interactions, inquires, etc.), a third region 425 for providing access to any number of user 'cases' or open issues, a fourth region 427 that suggests multiple topics about which the user may have interest (e.g., as determined by the integration platform), and a fifth region 429 for displaying and providing access to one or more communication channels (e.g., scheduled video call, etc.). As with the first exemplary interactive GUI 410, the contents, arrangement, etc. of the second exemplary interactive GUI 420 may be continually monitored, evaluated and/or updated to reflect user tendencies and/or preferences.

Notably, the interactive GUI of this disclosure, including the examples 410, 420 shown in FIG. 4A, may have alternative configurations, and provide access to alternative sets of features, operations, resources, services, etc., as described herein. For example, while a user is interacting with the interactive GUI 410, 420, auto-generated pop-up windows, dialogue boxes, messages, etc. may be generated and displayed to the user. The auto-generated pop-up windows may include, for example, actionable notices, alerts, icons, links to suggested services and/or resources, messages from the enhanced AI-driven chat-bot discussed above (e.g., with links to begin interactions), etc. Selection of the actionable notices, alerts, icons, links, etc. may initiate the suggested services and/or resources. In some embodiments, one or more of the suggested services and/or resources may be initiated automatically, with no further input from the user. In some embodiments, the auto-generated pop-up windows may be generated in response to user-activity monitoring and modeling functions executed by the integration platform described herein. In some embodiments, the type and/or frequency of auto-generated pop-up windows may also be determined and adjusted automatically according to the monitored and modeled user-activity. In some embodiments, the auto-generated pop-up windows may be configured to automatically close or disappear after a pre-determined period of time.

Figure 5:
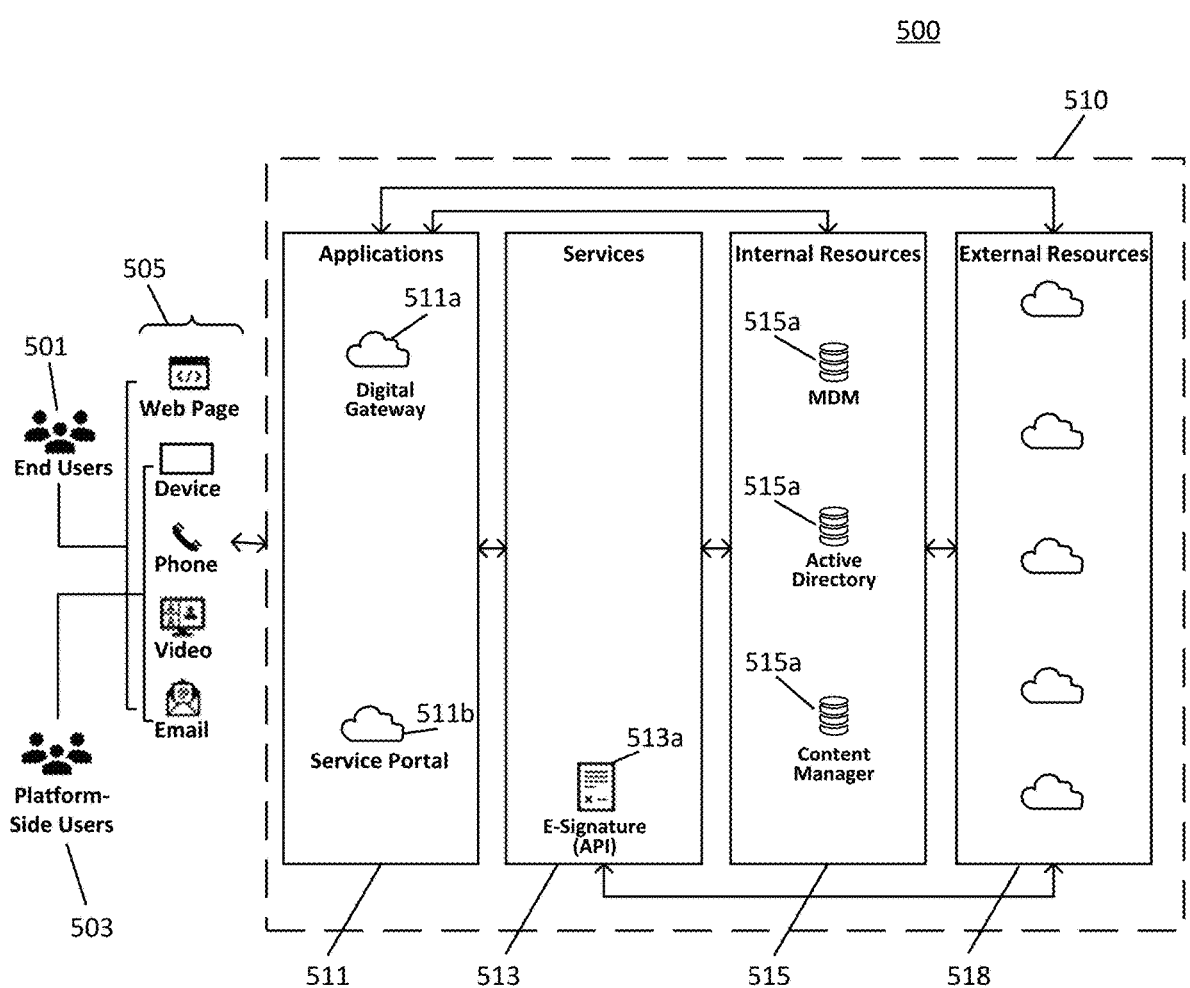
FIG. 5 illustrates a diagram of an exemplary architecture of an exemplary integration platform according to the present disclosure.

Turning now to FIG. 5, a diagram of an exemplary architecture 500 of an exemplary integration platform 510 is shown. The architecture 500 comprises one or more servers (not shown) in communication with a combination of internal resources 515 and external resources 517. The one or more servers may comprise one or more processors, memory and computer-readable instructions that, when executed by the one or more processors, cause the one or more servers to perform one or more of the integration platform 510 functions described herein. For example, the computer-readable instructions may comprise one or more software applications 511 that, when executed by the one or more processors, generate a digital gateway 511*a* and/or a service portal 511*b* through which end-users 501 and/or platform-side users 503 may access one or more of the services 513, internal resources 515 and/or external resources 517 of the integration platform 510. In some embodiments, end-users 501 and/or platform-side users 503 may directly access one or more of the services 513, internal resources 515 and/or external resources 517, without utilizing the digital gateway 511*a* and/or the service portal 511*b*.

The computer-readable instructions may also include code to generate one or more application program interfaces (APIs) 513*a* that allows two or more applications 511 (or other software programs within or accessible by the integration platform 510), as well as the services 513, internal resources 515 and/or external resources 517, to communicate with each other. Although only one API 513*a* is depicted in FIG. 5 (e.g., for requesting e-signature services from an internal resource 515), it should be understood that the integration platform 510 may include any number of API's 513*a*, and that the API's 513*a* may be live insofar as they may be configured to refresh in real-time or near real-time to provide seamless access to any of the applications 511, services 513 and/or resources 515, 517 described herein.

The internal resources 515 may comprise any physical or virtual components within the integration platform 510. Internal server components and connected devices, as well as virtual components such as files, network connections, memory, etc., may be referred to as internal resources 515. As shown in this FIG. 5, the internal resources 515 may also include databases 515*a* and connections (e.g., network connections) that facilitate access to the external resources 517 and/or that may provide information and/or services directly to users 501, 503 (e.g., content management systems, document management systems, video chat, etc., to name a few of potentially many) via any number of delivery/access channels 505.

The external resources 517 may include any combination of product, data and/or service offerings provided by one or more independent systems or networks. As shown, the external resources 517 include a combination of cloud-based services, such as web-based meetings, document management, contact center as a service, etc., although it should be understood that the present disclosure is not limited thereto. Other types of external resources 517 may also be included in the integration platform 510 without departing from the scope of the present disclosure. The external resources 517 may be accessed by the internal resources 515 to facilitate access to the users 501, 503, and/or the external resources 517 may be delivered straight to the users 501, 503 (e.g., via one or more delivery/access channels 505, such as a software application downloaded on a user device) to be accessed directly by the users 501, 503.

Users 501, 503 may access a combination of internal resources 515 and external resources 517 via the one or more portal applications 511 such as a digital gateway 511*a*, a service portal 511*b*, etc. generated by the one or more servers. In addition, users 501, 503 may also directly access the internal resources 515 and/or external resources 517 via one or more delivery/access channels 505 (e.g., smartphone, e-mail, dedicated web-application, etc.) using, for example, a single log-in procedure.

Figure 6:
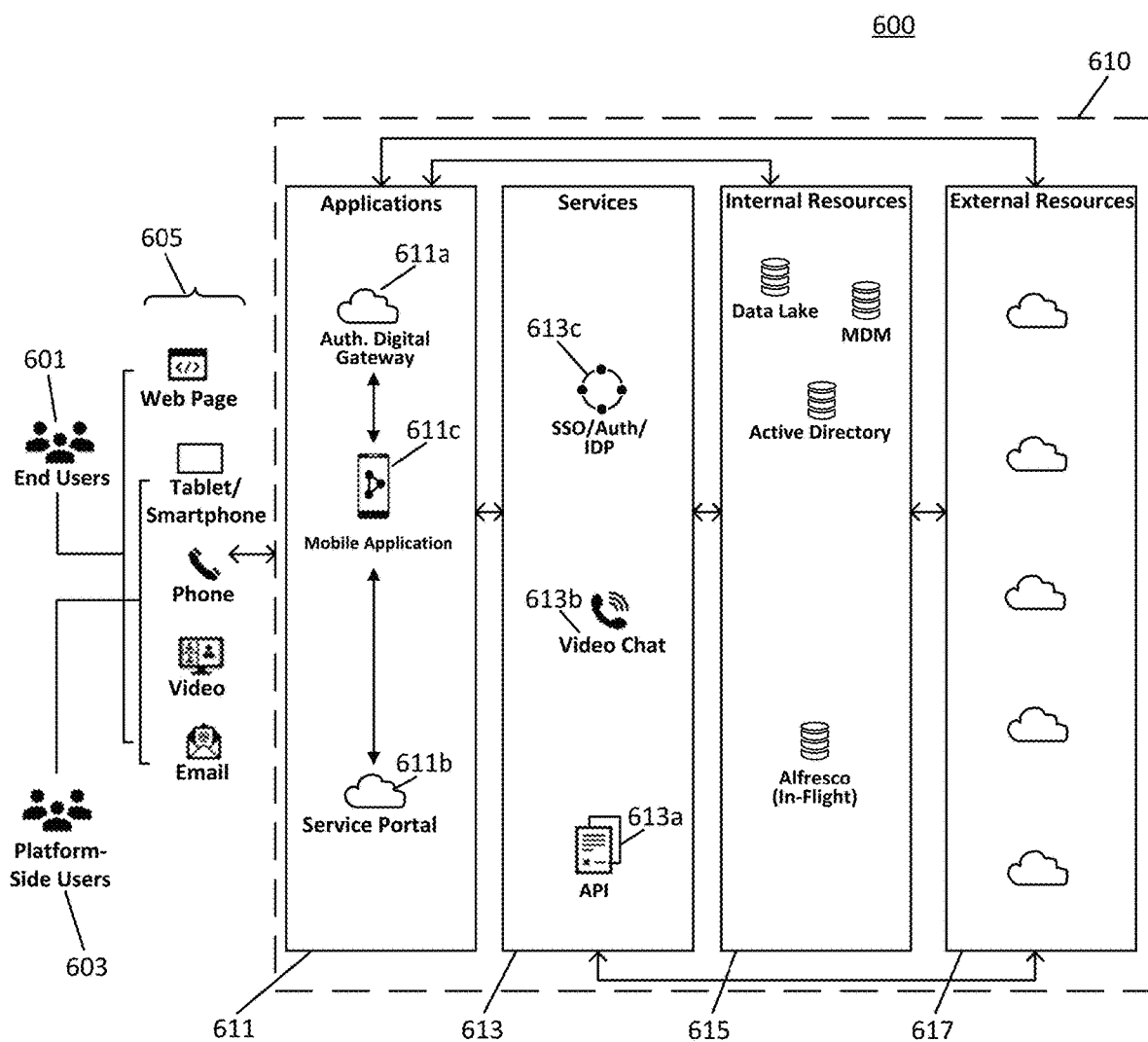
FIG. 6 illustrates a diagram of an exemplary architecture of an exemplary integration platform according to the present disclosure.

Turning now to FIG. 6, a diagram of an exemplary architecture 600 of an exemplary integration platform 610 that integrates multiple independent electronic systems, data, and information resources, and provides access to the same via an adaptive and intuitive interactive GUI 611*c* is shown. This exemplary architecture 600 comprises one or more servers in communication with a combination of internal resources 615 and external resources 617. The one or more servers may comprise one or more processors, memory and computer-readable instructions that, when executed by the one or more processors, cause the one or more servers to perform one or more functions of the integration platform 610 described herein. The computer-readable instructions may comprise one or more software applications 611 that, when executed by the one or more processors, generate a digital gateway 611*a* (e.g., a commercial digital gateway), a service portal 611*b*, and/or a mobile application which includes the user-adaptive interactive GUI 611*c* that can be securely accessed by both end-users 601 and platform-side users 603 from devices that do not need to be connected to their respective corporate networks, for example. The digital gateway 611*a*, service portal 611*b*, and/or mobile application may be utilized (by end-users 601 and/or platform-side users 603) to access any of the integration platform's 610 applications 611, services 613, internal resources 615 and/or external resources 617 via any number of delivery/access channels 605. In some embodiments, end-users 601 and/or platform-side users 603 may directly access one or more of the services 613, internal resources 615 and/or external resources 617 directly via any number of delivery/access channels 605, without utilizing the digital gateway 611*a*, the service portal 611*b* and/or the mobile application.

The computer-readable instructions may also include code to generate one or more application program interfaces (APIs) 613*a* that allows two or more applications 611 (or other software programs within or accessible by the integration platform 610), as well as the services 613, internal resources 615 and/or external resources 617, to communicate with each other. The integration platform 610 may include any number of API's 613*a*, and that the API's 613*a* may be live insofar as they may be configured to refresh in real-time or near real-time to provide seamless access to any of the applications 611, services 613 and/or resources 615, 617 described herein The user-adaptive interactive GUI 611*c* may be configured to provide a single point of access to both the digital gateway 611*a* and/or the service portal 611*b*, that in turn enables access certain among the services 613 and/or resources 615, 617. The user-adaptive interactive GUI 611*c* may also be configured to provide direct access to certain others among the services 613 and/or resources 615, 617 (e.g., without having to first connect to the digital gateway 611*a* or the service portal 611*b*). As a result, by activating the user-adaptive interactive GUI 611*c* (e.g., via an application or web interface accessible via a user's computing device), users 601, 603 may access any and all services 613, internal resources 615 and/or external resources 617 provided by the integration platform 610.

Further, the integration platform 610 may include 'single sign-on' technology as a service 613*c*, which enables a user 601, 601 to enter a single instance of sign-on credentials (e.g., user name and password, biometric sign-on, etc.) to access every service 613 and/or resource 615, 617 to which each user 601, 603 is authorized to access. This is to be contrasted, for example, with platforms that require separate sign-on credentials for each independent service and/or resource. This 'single sign-on' technology as a service 613*c* may comprise advanced security (e.g., government grade), and identity and entitlement management protocols and services.

Once a user 601, 603 has signed-on and has been authenticated, the user-adaptive interactive GUI 611*c* may present the user 601, 603 with some or all available services 613 and/or resources 615, 617, which may include user-specific content, suggestions, updates, messages, etc. as discussed above. Initiating any of the features available through the user-adaptive interactive GUI 611*c* may cause the integration platform 610 to connect to and/or activate the requested service 613 and/or resource 615, 617 through the appropriate gateway (e.g., 611*a*), portal (e.g., 611*b*) and/or via direct connection. Notably, the user 601, 603 will not have to change applications 611 to access different services 613 or resources 615, 617. Instead, the user 601, 603 will be able to access additional and/or alternative services 613 and resources 615, 617 directly from the user-adaptive interactive GUI 611*c*, or directly from the particular service 613 and/or resource 615, 617 the user 601, 603 is currently accessing. For example, if the user 601, 603 is accessing a video chat service 613*b* and desires to upload a document, the user 601, 603 may enact this upload service (not shown in FIG. 6) directly from the video chat service 613*b*.

As will be appreciated, the architecture described herein, including architecture 600 depicted in FIG. 6, represents a vast improvement over existing architectures. Indeed, existing architectures generally require users to access resources individually, and they provide no means for various resources to communicate and/or share data and information. As a result, resources of existing systems lack contextual information and support capabilities of other available resources, thereby resulting in system inefficiencies and inferior user experiences. Further, existing architectures (including their respective resources) have no inbuilt mechanism for contacting system-side users, if needed, for immediate assistance. The architecture 600 of the present disclosure, on the other hand, addresses these and other deficiencies by integrating and making available any number of internal 615 and external resources 617, seamlessly via a single interface 611*c*, while also providing means for immediately accessing platform-side users 603 for assistance, if needed.

Figure 7:
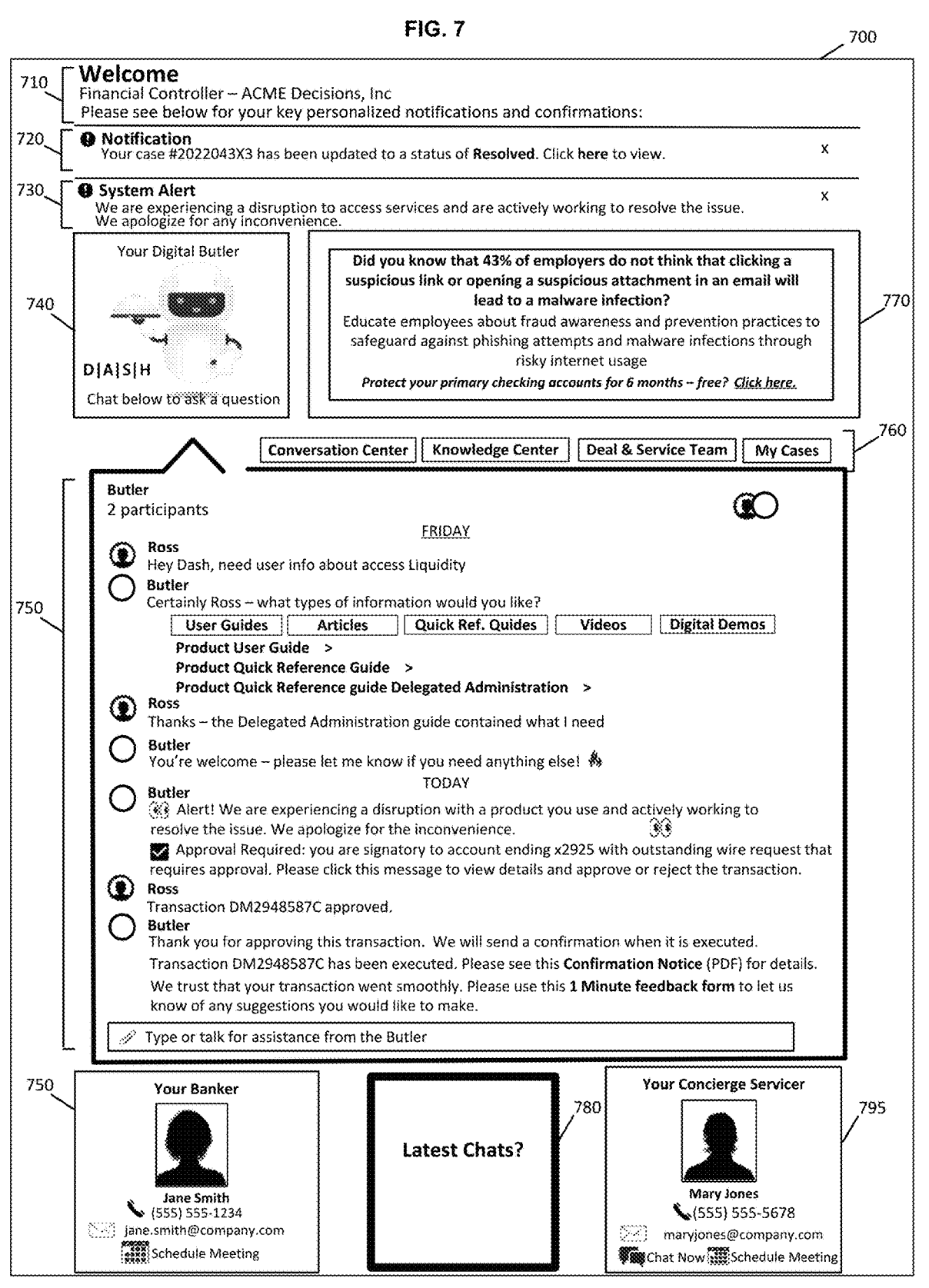

Turning now to FIG. 7, an exemplary embodiment of the user-adaptive GUI 700 is shown. In this embodiment, the interactive GUI 700 displays items and information customized for a particular user (in this case, Ross), following authentication of the user. As shown, the interactive GUI 700 includes a customized greeting 710 that includes the user's name, title and company ("Welcome Ross Financial Controller—ACME Decisions, Inc."). As with other features, this greeting 710 may also be customized. This exemplary interactive GUI 700 also includes notifications 720 (specific to the user's account and/or activity), system alerts 730, an enhanced AI-driven chat bot avatar 740 (in this example, referred to as a 'Digital Butler' named 'DASH') with which the user has or is having an interactive conversation, a display area 750 of the chat bot conversation (where 'Butler' indicates chat bot portions of conversation, and 'Ross' indicates user portion of conversation), a plurality of icons (or widgets) through which the user may access other services (e.g., Knowledge Center, Deal and Service Team, My Cases, etc.), a text box showing a customized tip/advice 770, a dedicated area for the user's Latest Chats 780, interactive areas 790, 795 for connecting with one or more platform-side users, such as the user's dedicated Banker 790, the user's Concierge Service representative 795, etc. This exemplary interactive GUI 700 may include additional and/or alternative areas and selectable features, and it may be arranged in a manner that reflects the user's particular habits, preferences and/or behavior (as learned by the system). It is also noted that the user may access any or all of the services and functions included in the interactive GUI 700 from the same screen, without having to open another window, leave the current interactive GUI 700 or activate another interface.

Features and functions of the interactive GUI described herein are facilitated and/or characterized by, among other things, a new integration platform that integrates and provides seamless access to any number of services, internal resources and external resources, all from the interactive GUI; a new, uniquely designed responsive web and smart device application GUI, which enable users to interact with the interactive GUI as discussed above; a user authenticated service/experience cloud portal that may be utilized to correctly identify users and secure and personalize their respective interactive sessions; new external digital interaction capabilities that deliver (among others) robust multi-party persistent chat, scheduling and video chat functionality; new digital telephony solutions that allow authenticated calling and routing for voice calls; an AI-driven chat-bot; data repository solutions to ensure all user, account, transaction and interaction data are captured to ensure advanced analytical and AI based capabilities can personalize and recommend appropriately throughout each user experience/session; and others.

Embodiments of the subject matter and the functional operations described in this disclosure can be implemented in digital electronic circuitry, in tangibly-embodied computer software or firmware, in computer hardware, including the structures disclosed in this specification and their structural equivalents, or in combinations of one or more of them. Embodiments of the subject matter described in this disclosure, including components, features, functions, operations, etc. of the integration platform, the interactive GUI, the AI-driven chat-bot, etc., may be implemented as one or more computer programs, i.e., one or more modules of computer program instructions encoded on a tangible non-transitory storage medium/program carrier for execution by, or to control the operation of, a data processing apparatus (or a computing system). Additionally, or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

In an exemplary embodiment, a system according to the present disclosure may include an integration platform. The integration platform may comprise one or more servers, one or more processors, and a memory storing computer-readable instructions that, when executed by the one or more processors, cause the integration platform to perform operations. The operations may include generating in interactive graphical user interface (GUI) that simultaneously displays one or more regions, each of which may be associated with a combination of one or more services of the integration platform, one or more internal resources of the integration platform, and one or more external resources from among one or more third-party computing systems. The operations may further include receiving, over a communications network, input from a user device via the interactive GUI. The input may comprise a selection of at least one among the one or more services, the one or more internal resources and the one or more external resources. Responsive to receiving the input, the operations may include providing access, to the user device via the interactive GUI, to at least one among the one or more services, the one or more internal resources and the one or more external resources associated with the selection. Further, the operations may include monitoring and capturing interaction data associated with activity between the user device and the integration platform, and executing one or more machine learning models, based on the interaction data, to predict user-specific interaction tendencies. The operations may also include revising one or more aspects of interactive GUI based on the predicted user-specific interaction tendencies. Moreover, the operations may further include any of the other features, functions, and operations discussed herein.

In an exemplary embodiment, a method according to the present disclosure may be executed, at least in part, by an integration platform. The integration platform may include one or more servers, one or more processors, and a memory storing computer-readable instructions that, when executed by the one or more processors, cause the integration platform to perform operations according to the method. The method may include generating in interactive graphical user interface (GUI) that simultaneously displays one or more regions, each of which may be associated with a combination of one or more services of the integration platform, one or more internal resources of the integration platform, and one or more external resources from among one or more third-party computing systems. The method may further include receiving, over a communications network, input from a user device via the interactive GUI. The input may comprise a selection of at least one among the one or more services, the one or more internal resources and the one or more external resources. Responsive to receiving the input, the method may include providing access, to the user device via the interactive GUI, to at least one among the one or more services, the one or more internal resources and the one or more external resources associated with the selection. Further, the method may include monitoring and capturing interaction data associated with activity between the user device and the integration platform, and executing one or more machine learning models, based on the interaction data, to predict user-specific interaction tendencies. The method may also include revising one or more aspects of interactive GUI based on the predicted user-specific interaction tendencies. Moreover, the method may further include performing or executing any of the other features, functions, and operations discussed herein.

In an exemplary embodiment, a tangible non-transitory storage medium according to the present may include one or more sequences of computer-readable instructions that, when executed by one or more processors, cause a computer device or system to perform operations. The operations may include generating in interactive graphical user interface (GUI) that simultaneously displays one or more regions, each of which may be associated with a combination of one or more services of the integration platform, one or more internal resources of the integration platform, and one or more external resources from among one or more third-party computing systems. The operations may further include receiving, over a communications network, input from a user device via the interactive GUI. The input may comprise a selection of at least one among the one or more services, the one or more internal resources and the one or more external resources. Responsive to receiving the input, the operations may include providing access, to the user device via the interactive GUI, to at least one among the one or more services, the one or more internal resources and the one or more external resources associated with the selection. Further, the operations may include monitoring and capturing interaction data associated with activity between the user device and the integration platform, and executing one or more machine learning models, based on the interaction data, to predict user-specific interaction tendencies. The operations may also include revising one or more aspects of interactive GUI based on the predicted user-specific interaction tendencies. Moreover, the operations may further include performing or executing any of the other features, functions, and operations discussed herein.

The terms "apparatus," "device," and "system" refer to data processing hardware and encompass all kinds of apparatus, devices, and machines for processing data, including by way of example a programmable processor, a computer, a server or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, an application program, an engine, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

A computer suitable for the execution of a computer program according to this disclosure may include, by way of example, special purpose microprocessors or another kind of specifically-configured central processing unit. A central processing unit according to this disclosure may receive instructions and data from a read-only memory or a random-access memory or both. Elements of a computer may include one or more central processing units for performing or executing instructions and one or more memory devices for storing instructions and data. A computer may also include, or be operatively coupled to receive, data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a laptop computer, a desktop computer, a television, a mobile audio or video player, a game console, a Global Positioning System (GPS), an assisted Global Positioning System (AGPS) receiver, a portable storage device, such as a universal serial bus (USB) flash drive, to name just a few.

Computer-readable media suitable for storing computer program instructions and data may include all forms of non-volatile memory, media and memory devices, including by way of example, semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, such as a CRT (cathode ray tube), LCD (liquid crystal display) monitor or other suitable display device for displaying information to the user and one or more input devices (e.g., a keyboard and a pointing device, such as a mouse or a trackball, a biometric scanner/reader, a touchscreen, etc.) by which the user can provide input to the computer. Other kinds of devices can be used to provide for interaction with a user as well such as, for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a wired and/or wireless communication network. Examples of communication networks include a local area network (LAN) and a wide area network (WAN), such as the Internet.

The computing system can include clients and servers. A client and server may be co-located and/or remote from each other, and they may interact through one or more of a wired and wireless communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the disclosure or of what may be claimed, but rather as descriptions of features specific to particular embodiments of the disclosure. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, unless otherwise specifically defined herein, all terms are to be given their broadest possible interpretation including meanings implied from the specification as well as meanings understood by those skilled in the art and/or as defined in dictionaries, treatises, etc. It is also noted that, as used in the specification and the appended claims, the singular forms "a," "an," and "the" include plural referents unless otherwise specified, and that the terms "comprises" and/or "comprising," when used in this specification, specify the presence or addition of one or more other features, aspects, steps, operations, elements, components, and/or groups thereof. Moreover, the terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship. In this disclosure, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only and are not to be construed as limiting the described subject matter.

The foregoing is provided for purposes of illustrating, explaining, and describing embodiments of this disclosure. Modifications and adaptations to the embodiments will be apparent to those skilled in the art and may be made without departing from the scope or spirit of the disclosure.

What is claimed is:

1. A computer-implemented method comprising:
    generating, by an integration platform, an interactive graphical user interface (GUI) comprising a selectable artificial intelligence (AI) driven chat-bot resource configured to provide a conversational message-based dialogue that processes user input and returns with a user-specific response, the integration platform comprising one or more servers, the one or more servers comprising one or more processors executing computer-readable instructions stored in memory;
    simultaneously displaying, by the interactive GUI, one or more regions, each associated with a combination of one or more services of the integration platform, one or more internal resources of the integration platform, and one or more external resources from among one or more third-party computing systems,
    the one or more services comprising a combination of single sign-on (SSO) services and application program interface (API) services, and
    the one or more external resources comprising a combination of cloud-based services, communication services, scheduling services for groups of users, document services, knowledge-based services, and artificial-intelligence (AI) modeling services;
    receiving, by the integration platform over a communications network, input from a user device via the interactive GUI, said input comprising a selection of at least one among the one or more services, the one or more internal resources and the one or more external resources;
    responsive to receiving the input, providing the user device access, via the interactive GUI, to the at least one among the one or more services, the one or more internal resources and the one or more external resources associated with the selection;
    monitoring and capturing, by the integration platform, interaction data associated with activity between the user device and the integration platform;
    executing, by the integration platform, one or more machine learning models, based on the interaction data, to predict user-specific interaction tendencies; and
    revising, by the integration platform, one or more aspects of interactive GUI based on the predicted user-specific interaction tendencies.

2. The computer-implemented method of claim 1, further comprising:
    generating, by the integration platform, one or more of a digital gateway and a service cloud portal; and
    providing, by the interactive GUI, access to one or more among the one or more services, the one or more internal resources and the one or more external resources via at least one among the digital gateway and the service cloud portal.

3. The computer-implemented method of claim 2, further comprising:
    providing simultaneous access, by the interactive GUI, to a combination of the one or more services, the one or more internal resources and the one or more external resources.

4. The computer-implemented method of claim 1, wherein the SSO services comprise authentication and authorization services associated with granting access to the internal resources, the external resources, and to other services of the integration platform, and
    wherein the API services comprise enabling communications among applications, services and resources of the integration platform and the third-party computing systems.

5. The computer-implemented method of claim 1, wherein the internal resources comprise a combination of databases and network connections configured to facilitate access to the external resources and to information and services of the integration platform.

6. The computer-implemented method of claim 1, further comprising:
    interpreting, by the AI-driven chat-bot through machine learning modeling, user-specific queries according to the user-specific interaction tendencies, said user-specific interaction tendencies comprising user-specific language tendencies, such that different users providing a same query to the AI-driven chat-bot results in different user-specific responses.

7. The computer-implemented method of claim 1, wherein the interactive GUI further comprises a selectable communications resource that, when selected, provides a fully-persistent multi-party communications interface configured to initiate and maintain ongoing communications amongst multiple users via multiple user devices, the ongoing communications comprising one or more of a text-based communication, a voice call, and a video call.

8. The computer-implemented method of claim 1, wherein the interactive GUI further comprises a selectable document sharing resource that, when selected, enables users to one or more of upload digital documents, e-sign digital documents, route digital documents to one or more other users, modify digital documents and complete digital documents.

9. The computer-implemented method of claim 1, wherein the interactive GUI further comprises a selectable notification resource that, when selected, provides access to automated notifications, alerts and messages generated by the integration platform responsive to monitored activity between the user device and the integration platform.

10. The computer-implemented method of claim 1, wherein the interactive GUI further comprises a selectable knowledgebase resource comprising a combination of storage devices, memory and data repositories accessible through the integration platform, the selectable knowledge base resource, when selected, at least one of predicts, suggests and organizes content, via machine learning modeling, according to user-specific interaction tendencies.

11. The computer-implemented method of claim 1, wherein the interactive GUI further comprises a selectable next best advice resource that, when selected, generates, via machine learning modeling, personalized recommendations, advice and suggested actions according to the user-specific interaction tendencies.

12. The computer-implemented method of claim 1, wherein the interactive GUI further comprises a selectable voice-of-client (VOC) resource that, when selected, receives real-time feedback during live user interactions between the user device and the integration platform, and automatically generates and displays prompts requesting user feedback during the live interactions.

13. The computer-implemented method of claim 1, wherein the interactive GUI further comprises a selectable embedded digital personality resource that, when selected, generates and displays a user-specific avatar for interacting with users according to the user-specific interaction tendencies, said user-specific interaction tendencies comprising user-specific language tendencies.

14. The computer-implemented method of claim 1, wherein at least one from among the one or more services, the one or more internal resources and the one or more external resources is directly accessible from at least one other from among the one or more services, the one or more internal resources and the one or more external resources.

15. The computer-implemented method of claim 1, further comprising:
automatically initiating, by the integration platform, at least one from among the one or more services, the one or more internal resources and the one or more external resources, in response to the predicted user-specific interaction tendencies.

16. The computer-implemented method of claim 1, wherein at least one among the one or more regions comprises at least one selectable icon, and wherein the input from the user device comprises a selection of the at least one selectable icon.

17. The computer-implemented method of claim 1, further comprising:
modifying, by the integration platform, the one or more aspects of the interactive GUI during at least one of a current interaction between the user device and the integration platform, and before a subsequent interaction between the user device and the integration platform.

18. The computer-implemented method of claim 1, further comprising at least one of:
generating and transmitting, by the integration platform, the interactive GUI to the user device for rendering and display thereon, and
rendering, by the integration platform, the interactive GUI and transmitting, by the integration platform, the rendered interactive GUI to the user device for display thereon.

19. The computer-implemented method of claim 1, further comprising the integration platform:
determining, based on interaction data captured during a current interaction between the user device and the integration platform, one or more suggested user-specific services and resources; and
automatically generating and displaying, via the interactive GUI during the current interaction, at least one of an actionable notice, alert, link, and icon that, when selected, initiates the one or more suggested user-specific services and resources.

20. The computer-implemented method of claim 19, further comprising:
initiating, by the integration platform, at least one among the one or more suggested user-specific services and resources automatically, with no user input.

21. The computer-implemented method of claim 20, wherein at least one among the actionable notice, alert, link and icon are displayed via an auto-generated pop-up window.

22. The computer-implemented method of claim 1, further comprising:
dynamically revising, by the integration platform, the one or more aspects of interactive GUI during a current interaction between the user device and the integration platform.

23. The computer-implemented method of claim 1, further comprising the integration platform:
evaluating a performance of the one or more machine learning models against one or more performance metrics; and
retraining at least one among the one or more machine learning models when the evaluated performance falls below a predetermined performance threshold.

* * * * *